(12) United States Patent
Golan et al.

(10) Patent No.: US 7,499,889 B2
(45) Date of Patent: Mar. 3, 2009

(54) TRANSACTION SYSTEM

(75) Inventors: Lior Golan, Tel Aviv (IL); Nira Rivner, Ramat Gan (IL); Michal Tsur, Jerusalem (IL); Avi Rosen, Rishpon (IL); Teddy Flatau, Ganei-Tikva (IL); Ben Enosh, Jerusalem (IL); Naftali Bennett, New York, NY (US)

(73) Assignee: Cyota Inc., New York, NY (US)

( * ) Notice: Subject to any disclaimer, the term of this patent is extended or adjusted under 35 U.S.C. 154(b) by 74 days.

(21) Appl. No.: 10/469,951

(22) PCT Filed: Mar. 7, 2002

(86) PCT No.: PCT/IL02/00186

§ 371 (c)(1),
(2), (4) Date: Mar. 30, 2004

(87) PCT Pub. No.: WO02/071176

PCT Pub. Date: Sep. 12, 2002

(65) Prior Publication Data

US 2004/0254848 A1    Dec. 16, 2004

Related U.S. Application Data

(63) Continuation-in-part of application No. 09/693,890, filed on Oct. 23, 2000, now abandoned.

(60) Provisional application No. 60/273,826, filed on Mar. 8, 2001, provisional application No. 60/273,835, filed on Mar. 8, 2001, provisional application No. 60/273,836, filed on Mar. 8, 2001, provisional application No. 60/282,142, filed on Apr. 9, 2001.

(51) Int. Cl.
*G06Q 99/00* (2006.01)

(52) U.S. Cl. .............................. 705/50; 705/40; 705/26

(58) Field of Classification Search .................. 705/40, 705/26, 44, 39; 713/156; 380/30
See application file for complete search history.

(56) References Cited

U.S. PATENT DOCUMENTS 4,935,982 A    6/1990  Ennis (Continued)

FOREIGN PATENT DOCUMENTS

EP    1 028 644    8/2000

(Continued)

OTHER PUBLICATIONS

Roger K. Alexander, Cooment: E-Commerce Needs New Business Model, Oct. 26, 1999, American Banker Financial Publications, vol. 164 No. 206, p. 15.*

(Continued)

*Primary Examiner*—James P Trammell
*Assistant Examiner*—Behrang Badii
(74) *Attorney, Agent, or Firm*—Pearl Cohen Zedek Latzer, LLP

(57) ABSTRACT

As part of the present invention, there is provided a financial transaction system having a set of transaction facilitating protocols, each of which may be used either in conjunction with a 3D Secure system, environment or protocol, or on a standalone basis, within a conventional credit card processing system or environment, or with any other association standard which may be used in commerce.

13 Claims, 16 Drawing Sheets

U.S. PATENT DOCUMENTS

| | | | |
|---|---|---|---|
| 5,245,657 A | 9/1993 | Sakurai | |
| 5,590,197 A | 12/1996 | Chen et al. | |
| 5,903,721 A | 5/1999 | Sixtus | |
| 2002/0087469 A1* | 7/2002 | Ganesan et al. | 705/40 |
| 2002/0194076 A1* | 12/2002 | Williams et al. | 705/26 |

FOREIGN PATENT DOCUMENTS

| | | |
|---|---|---|
| WO | WO 99/66436 | 12/1999 |

OTHER PUBLICATIONS

Visa 3-D Secure Introduction, v. 1.0.2, Sep. 26, 2002 (printed from http://International.visa.com/fb/paytech/secure/pdfs/ on Sep. 4, 2003.

Visa 3-D Secure System Overview, v. 1.0.2, May 1, 2003 (printed from http://international.visa.com/fb/paytech/secure/pdfs/ on Sep. 4, 2003).

European Search Report for Application No. EP 06 12 0512 mailed Mar. 12, 2007.

* cited by examiner

TRANSACTION SYSTEM

RELATED APPLICATIONS

This patent application is a U.S. National Phase Application of PCT Application No. PCT/IL02/00186 which is a continuation-in-part application of U.S. patent application Ser. No. 09/693,890, filed on Oct. 23, 2000; and which claims the benefit of U.S. Provisional Patent Application Ser. No. 60/273,826, filed on Mar. 8, 2001; U.S. Provisional Patent Application Ser. No. 60/273,835, filed on Mar. 8, 2001; U.S. Provisional Patent Application Ser. No. 60/273,836, filed on Mar. 8, 2001; and U.S. Provisional Patent Application Ser. No. 60/282,142, filed on Apr. 9, 2001, each of which are hereby incorporate by reference in its entirety.

FIELD OF THE INVENTION

The present invention relates generally to the field of financial transactions. More specifically, the present invention relates to the field of credit card related transaction conducted over a communications network such as the Internet, and with other association standards that involve merchants and issuers.

BACKGROUND OF THE INVENTION

Credit Card transactions have become a preferred mode of payment for consumer goods to many consumers around the world. Due to the intangible nature of credit card information, and the ease by which it may be stolen and/or duplicated, security of credit card transactions has become a major issue. Issuers of credit cards strongly urge and motivate both users/customers and merchants to keep credit card information secure.

With the advent of the Internet and e-commerce (e.g. online purchases from a merchant's web site or web storefront) security of credit card information has become an even greater issue. Credit card information exchanged between a consumer and an online merchant travels over one or more unsecured networks where anyone of a number of parties may be able to duplicate the information and later use it as part of a fraudulent transaction. Various security techniques including encryption have been implemented by online merchants and/or credit card issuers to minimize the risk of credit card information theft on the Internet. However, other issues with online transactions stem from the fact that the consumer and the merchant in an online transaction are not in the same physical location. In online transactions, the merchant is not able to inspect the consumer to confirm that the consumer is the actual owner of the credit card being charged. On the other side, the consumer can not be sure, until after he or she receives a credit card bill, what is the exact amount the merchant is charging to his or her credit card.

Trying to address the above mentioned security problems, Visa International has been working on a new initiative called Visa 3D Secure. Visa International, together with E-Visa (the Visa US E-commerce division) are proposing a system called 3D Secure for Payer Authentication. The objective of Visa's 3D-Secure initiative is to verify cardholder account ownership during an electronic commerce purchase transaction. Visa's objectives are to create a virtual "card present" environment online and to move towards guaranteed payments to the merchant, much the same as they are in the offline world.

In general, Visa 3D-Secure protocol is not a payment protocol, but a payer authentication and receipt signing protocol whose objectives are to verify the account ownership of the payer during a transaction, and to provide the merchant with the equivalent of a signed receipt. There are four participating parties in the protocol: merchants, issuers, cardholders and Visa itself Participating merchants are required to integrate a plug-in (Merchant Plug-In—MPI) component into their Web storefronts and need to use a Validation Server to prove the authenticity of the digital signature on the transactions. Participating issuers are required to install two servers—the Enrollment Server that is used to register cardholders to the service, and the Access Control Server (ACS) that is used to authenticate the cardholders during the transactions. In addition, those issuers are required to register at Visa, to pass the relevant information (participating number ranges and ACS URLs) to Visa and to receive a private key that will be used to sign receipts.

Participating cardholders need just to register against their issuer and to choose an appropriate password that will be used to authenticate them before signing their receipts.

Visa either operates or will soon operate a central Visa Directory Server (VDS) that serves as a repository for the participating card number ranges and their associated ACS URLs.

The 3D-Secure protocol itself is based on two sets of request/response messages sent from the merchant's MPI to the issuer's ACS—the Verify Enrollment Request/Response (VEReq/VERes) and the Payer Authentication Request/Response (PAReq/PARes). The first request is used to check whether a specific card is enrolled in the service, and the second request is used to ask the issuer to authenticate the payer identity.

There are several components in the proposed 3D-Secure environment that are distributed between the issuer, the merchant and Visa:

At Visa:
1. VisaNet is a wide area network operated by Visa and responsible for switching credit card transactions from acquirers to issuers and to handle settlement of those transactions. Note that some local or domestic transactions won't be routed through VisaNet, but will be routed through local networks that are operated by national bodies, by third party processors or by the acquirers themselves.
2. The Visa Directory Server (VDS) is responsible for managing the list of participating card ranges and their appropriate ACS servers. This component acts as a central directory of all participating issuers, to allow the MPI to reach the proper ACS when needed.

At the Issuer:
3. The Access Control Server (ACS) is responsible for two tasks; (1) the first task is being to provide the merchant with information on whether or not a card is enrolled in the 3D-Secure service, and (2) the second being to present to the card holder the transaction receipt for the cardholder to approve, to authenticate his identity and to sign the receipt on his behalf.
4. The Enrollment Server is responsible for enrolling cardholders to the issuer's 3D-Secure service. This includes receiving cardholder enrollment requests (usually via the Web), receiving from the cardholder authenticating information, allowing the cardholder to select his password and registering the cardholder in the account holder's file.
5. The Authorization Server receives authorization requests from VisaNet, checks whether the cardholder has enough funds and/or credit and that the transaction is not susceptible to fraud. It then responds with an approve/decline authorization reply.

6. The Account Holders File holds the cardholder information needed to operate the 3D-Secure service. This information will usually be accessed through the cardholder PAN. This information includes the status of the cardholder enrollment, the information needed to authenticate the cardholder during the enrollment process and information used to authenticate the holder during the transaction process.

7. The Receipt File (optional) holds all the receipts that were signed during the 3D-Secure payer authentication process. It may be used to facilitate more efficient "Request for Copy" processing.

8. The Transaction Log File (optional) holds the entire log of all 3D-Secure transactions, including those that didn't pass authentication. This includes logs of the merchants' requests for authentication, the cardholder input during the process and the ACS response.

At the Merchant

9. The Storefront is responsible for all the merchant's interaction with the customer—from presenting the merchandise to him, to enabling him to search and browse the catalog, to managing his shopping cart, to accepting checkout payment and shipping instructions from the customer and finally to presenting him the receipt and getting his approval.

10. The Merchant Plug In (MPI) has three tasks: (1) The first task is to interact with the merchant's storefront (and possibly with the user account and transaction files) to receive the relevant transaction details at the proper time (usually at the receipt approval time) and to initiate the 3D-Secure process; (2) The second task is to check whether the card is enrolled in the 3D-Secure service, and to find which ACS is handling this card; and (3) The third task is to redirect the transaction details to the appropriate ACS, and to get the signed receipt in response for authentication of the card holder.

11. The Validation Server is responsible for checking whether the receipts the merchant gets from the ACS are signed properly. This component can run either as part of the MPI ("Thick client MPI") or as another server ("Thin client MPI").

12. The Receipt File is responsible for storing the signed receipts and later retrieving them in order to satisfy "Request for Copy" requirements at a time of dispute.

13. The Point of Sale (POS) is responsible to connect the merchant with his acquirer, to perform credit card transactions—from receiving authorizations, to capture the transactions for settlement and to making various adjustments if needed.

For purposes of clarity and completeness of disclosure, directly below is a list of terms and acronyms associated with credit card transactions in general and with the 3D-Secure protocol in specifically:

Credit Card Terms and Acronyms (Credit Card) Issuer—The financial institution that deals with cardholders ? that issues cards for them and that loans them money.

(Credit Card) Acquirer—The financial institution that deals with merchants who accept credit card payments.

(Credit Card) Cardholder—The holder of a credit card.

(Credit Card) Authorization—The process in which a credit card transaction is authorized by the issuer.

(Credit Card) Settlement—The process in which actual funds are transferred between the relevant parties in a transaction between the issuer, the acquirer, the merchant and Visa.

(Credit Card) Chargeback—When a cardholder disputes a transaction and tries to get back his money. This process is governed by Visa rules and regulations.

Request for Copy—The process during chargeback processing where the issuer requests a copy of the receipt from the acquirer. This copy is needed for dispute resolution.

VisaNet—A wide area networked owned and operated by Visa that's used to transfer credit card transaction messages (authorizations, settlements, chargebacks, ?) between participating financial institution. A similar network is operated by MasterCard and by other similar institutions.

VAP/Visa Access Point—The device used to connect an issuer or an acquirer to VisaNet. MasterCard has a similar device called MIP or MasterCard Interchange Point. An issuer can have more than one VAP or MIP.

(Credit Card) POS/Point Of Sale—Is the device used by merchants to connect to the credit card network and to process credit card transactions.

(Credit Card) PAN/Primary Account Number—Is the number that shows on top of the credit card, and that should be used for making electronic commerce transaction with that card.

Card Present/Card Not Present Transaction—Are transaction where the actual card is present or not (respectively) in the transaction. An electronic commerce transaction is a "Card not present" transaction.

On Us Transaction—Are transaction where the acquirer and issuer involved are the same one, or are processed by the same processor. In this case there is no need to switch the transaction though VisaNet.

Visa 3D-Secure Terms and Acronyms

PA/Payer Authentication—Is the 3D-Secure protocol responsible for authenticating the identity of the payer in an electronic commerce transaction.

SET/Secure Electronic Transaction—Is an older standard attempt by Visa and MasterCard. Unlike 3D-Secure, this standard dealt with all the steps of an electronic commerce transaction: cardholder authentication, transaction authorization and capture.

ACS/Access Control Server—Is a 3D-Secure component that sits at the issuer and that's responsible for handling the issuer's parts of the PA protocol.

MPI/Merchant Plug-In—Is a 3D-Secure component that sits at the merchant and that's responsible for handling the merchant's parts of the PA protocol. VDS/Visa Directory Server—Is a 3D-Secure component that sits at Visa and that serves as a central directory of all the ACS and their corresponding card number ranges.

Enrollment Server—Is a 3D-Secure component that sits at the issuer and that's responsible for handling enrolment requests for cardholders that wish to enroll to the service.

VEReq/Verify Enrollment Request—Is the 3D-Secure message that is used to query whether a specific card is enrolled in the service.

VERes/Verify Enrollment Response—Is the response for the VEReq message.

PAReq/Payer Authentication Request—Is the 3D-Secure message that is used to ask the ACS to authenticate the payer identity and to sign the receipt on his behalf.

PARes/Payer Authentication Response—Is the response for the PAReq message.

Turning now to FIG. 1, there is shown a system level diagram depicting the interactions between various 3D Secure components during a credit card transaction. Depicted in FIG. 1 are the steps by which a transaction may be consummated in accordance with the 3D Secure standard:

1. A cardholder may surf the Internet and initiate an online purchase. During the purchase process, the cardholder may be required to provide his credit card manually.
2. At the last confirmation page of the Merchant's web-site or "Store Front", right before the deal is made—the Merchant's web site may activate its plug-in. Upon activation, it supplies the plug-in with the card number and transaction details to be signed by the cardholder. These transaction details are referred to as the Receipt.
3. The plug-in may connect to the Visa Directory Server (VDS) to find out if this card is enrolled in the system. The request is processed and received with a VerifyEnrollmentRes message.
4. If the card is enrolled, the Visa Directory Server (VDS) replies to the plug-in with the URL of the appropriate issuer's Access Control Server (ACS). If the card is not enrolled, the VDS replies with a "Not Enrolled" answer. The reply is processed by the VerifyEnrollmentRes message. Upon receiving a "Not Enrolled" answer—the Merchant continues to process the order conventionally. If the card is not enrolled—the cardholder may get the normal "Thank you" page and the card number will be passed to the acquirer for conventional authorization.
5. If the card is enrolled, the Merchant plug-in may reply to the cardholder's browser with a redirect to Issuer's Access Control Server's (ACS) URL. This redirect message carries the Receipt to be signed (PAReq message).
6. The Issuer's Access Control Server (ACS) may authenticate the cardholder and request transaction confirmation. It is up to each Issuer to select an authentication method (e.g. Password or PIN). When confirming the transaction, the cardholder may typically see the receipt as was sent by the Merchant.
7. The cardholder may accept the transaction.
8. The Issuer may digitally sign the receipt and return it to the Merchant. The Merchant may verify the content of the receipt and the validity of the signature.
9. The Merchant may send the signed receipt to the Acquirer.
10. Payment between the Acquirer and the Issuer remains unaffected.

At the end of each purchase using a 3D Secure system, the 3D Secure protocol provides the merchant with a receipt which was digitally signed by the Issuer on behalf of the cardholder. This receipt may be used as "card present" evidence by the merchant in case of dispute originated by the cardholder. Furthermore, the issuer now has a list of all Receipts that include such information as Merchant URL, amount, description of goods, etc. This can be presented to the user in an orderly manner through the Issuer's online banking system.

However, the 3D Secure solution has many shortcomings, including doing nothing to secure the customer's position in the transaction and to secure the customer's credit card information. 3D Secure does not solve data security issues. Once a cardholder's card number has been released to the Merchant, there is no way of guarding its integrity. Merchants may misuse the number or their sites may be hacked.

Many cardholders are still afraid to put their card on the Web. Using 3D Secure, they still have to enter the card number into Merchant sites. This may deter many from shopping online.

SUMMARY OF THE INVENTION

As part of the present invention there is provided a financial transaction system having a set of transaction facilitating protocols, each of which may be used either in conjunction with a 3D Secure system, environment or protocol, or on a standalone basis, within a conventional credit card processing system or environment, or any other association standard which may be used in commerce. The present invention may apply to credit cards, debit cards, or any other financial transaction related systems or protocols.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
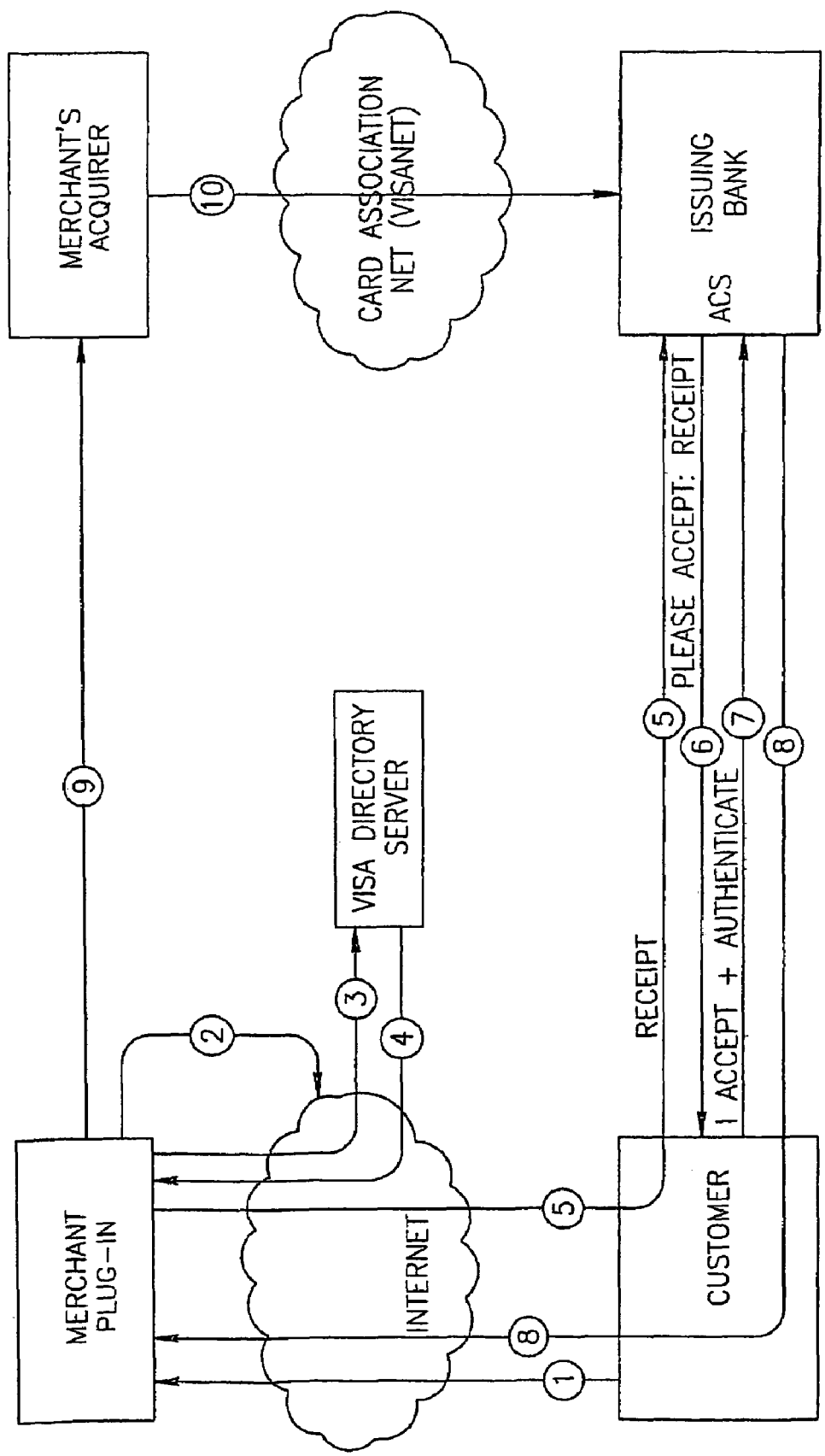
FIG. 1 is a system level diagram depicting the interactions between various 3D Secure components during a credit card transaction.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a financial transaction system having a set of transaction facilitating protocols, each of which may be used either in conjunction with a 3D Secure system, environment or protocol, or on a standalone basis, within a conventional credit card processing system or environment. The set of protocols upon which the transaction system of the present invention is based may serve eight functions; (1) On Demand Registration, (2) Pre Authorization, (3) Using a Client Application, (4) Handling Auctions Using Email/Instant Message, (5) Matching Receipt Data in Authorization, (6) Loyalty Program Management, (7) Proxy Number Integration, and (8) Purchase Order Payment Reconciliation.

On Demand Registration

Figure 2A:
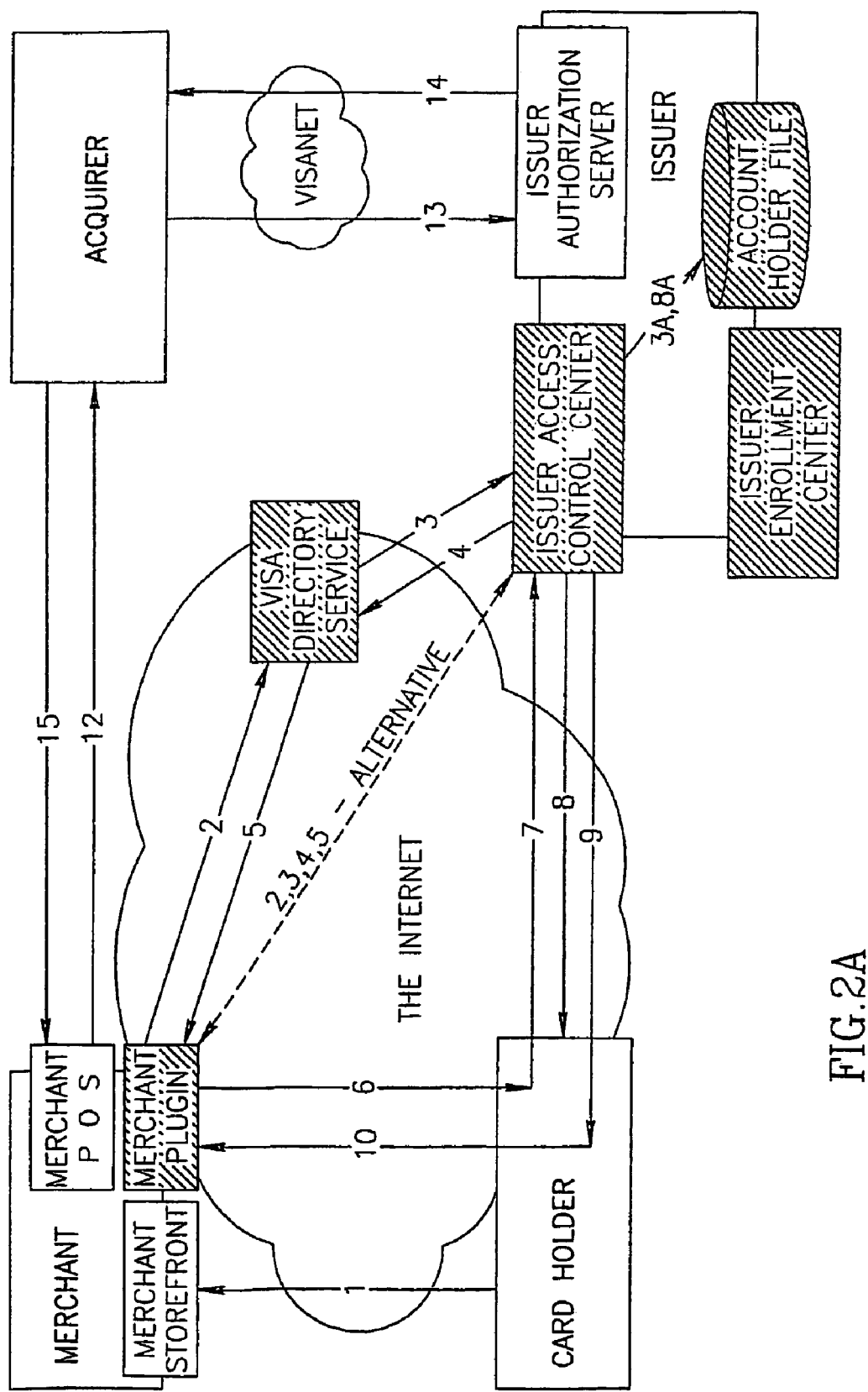
FIG. 2A is a diagram depicting transaction flow between 3D-Secure components when the cardholder is already enrolled in the service.

According to 3D-Secure operation, in order to authenticate a payer's or customer's identity, the payer needs to be pre-registered to the service offered by his or her issuer. Turning now to FIG. 2A, there is shown a diagram depicting transaction flow between 3D-Secure components when the cardholder is already enrolled in the service. The steps are:

1. Cardholder may brows a merchant site, select merchandise, checks out, select payment method and provides payment information. At this stage everything is ready for the cardholder to receive a receipt.
2. The MPI may send a VEReq to the VDS (or directly to the Issuer's ACS if the MPI knows the ACS URL.). The VEReq contains the payment card number (the PAN). The VDS queries its internal database for a card number range that contains the PAN and forwards the request to the associated ACS.
3. The ACS may receive the VEReq and may check its Account Holder File to see if the cardholder is enrolled.
4. The ACS may see that the cardholder is enrolled. The ACS may format a VERes that indicates that the cardholder is enrolled, attaching also the URL of the ACS that will authenticate the cardholder.
5. The VDS may forward the response to the MPI.
6. The MPI may prepare a PAReq containing all the relevant transaction receipt details, and may send them through the cardholder browser to the ACS. The details may include all the payment details (PAN, expiry date . . . ), all the receipt details (merchant name and id, transaction amount and currency, transaction date, order description, etc. . . . ) and in addition the merchant's URL where a response is expected and optionally additional data needed by the merchant to resume the purchase session.
7. The cardholder browser may redirect the request to the ACS.
8. The ACS may present the cardholder all the relevant receipt details and asks him to sign the receipt with his password. It may check the password against its Account Holder File.
9. On successful sign-in, the ACS may format a PARes message based on the details from the PAReq and signs it with its own private key. The signed PARes is sent back to the MPI through the cardholder browser.
10. The cardholder browser may redirect the request to the MPI.
11. The MPI may check the signed receipt making sure the details match; that there is a signature and that the key that signed it was issued by the right authority. If all goes well, the payer identity is authenticated.
12. After the MPI sees that everything is ok, it passes the payment-processing job to the POS, which initiates an authorization request and sends it to the acquirer.
13. The acquirer forwards the authorization request to the issuer through VisaNet.
14. The issuer may get the authorization request and checks that the account number is valid, that there are enough funds/credit, etc. . . . If all is well, the issuer may send an "approved" authorization response to the acquirer. If something is wrong, it may send a "declined" authorization response.
15. The acquirer may send the authorization response back to the merchant. The transaction is authenticated and authorized.

16. In a final step (not shown in the diagram) the transaction may be settled. Typical settlement step works are:
   a. The merchant captures the transaction and sends it through the POS to the acquirer. This is a batch-processing step that's usually performed for several transactions at once.
   For each transaction, the details sent are comprised of about the same details that were sent in the authorization, with the addition of the authorization code received in the authorization reply.
   Note that the captured details might differ slightly from the authorized ones (for example, in the case of a split shipment).
   b. The acquirer builds its clearing file from all the captures he received from the merchants and sends it to Visa.
   c. Visa splits all the clearing files it received from the acquirers according to the issuer's number ranges and builds appropriate files for each issuer.
   d. Visa calculates how much each issuer needs to pay; counting the total transaction amount and the various fees the issuer either gets or pays. It also calculates how much each acquirer needs to receive.
   e. Visa sends "Fee collection" messages to the issuers, receiving the funds from them and transferring what's needed to the acquirers.
   f. Visa sends the clearing files to the issuers. Each issuer now goes over each record of the clearing file and posts the transaction to the appropriate cardholder file.
   g. The issuer now needs to collect the appropriate payment from its cardholders.

According to the 3D-Secure standards, when the issuer's ACS gets a VEReq for a non-registered PAN, it should return a "No" VERes. This protocol, however, does not take advantage of the fact that the Issuer may use this opportunity to try to register his cardholders while the cardholder is in the middle of a relevant transaction.

Taking advantage of the fact that the issuer receives VEReq for non-registered cardholders who are in the middle of an online transaction, the issuer can push to cardholder's web-browser a message asking them to register. Instead of returning a "No" VERes for a non-registered cardholder, the issuer's ACS can return a "Yes" VERes, and when it gets the PAReq redirection to the relevant web-browser, to push a message asking cardholder to register. In the VERes the ACS sends the URL, the MPI redirects the browser to that URL and this is a registration URL. If the cardholder does not complete his registration, the ACS may return a negative PARes response, as if the cardholder wasn't able to authenticate themselves. Or the ACS may send a "un-available" response. The ACS can decide whether to behave normally (e.g. according to the 3D-Secure standard) or to perform an on demand registration on a cardholder per cardholder basis. That means that not all cardholders will necessarily be required to register at once or upon first attempt to a 3D-Secure transaction.

Figure 2B:
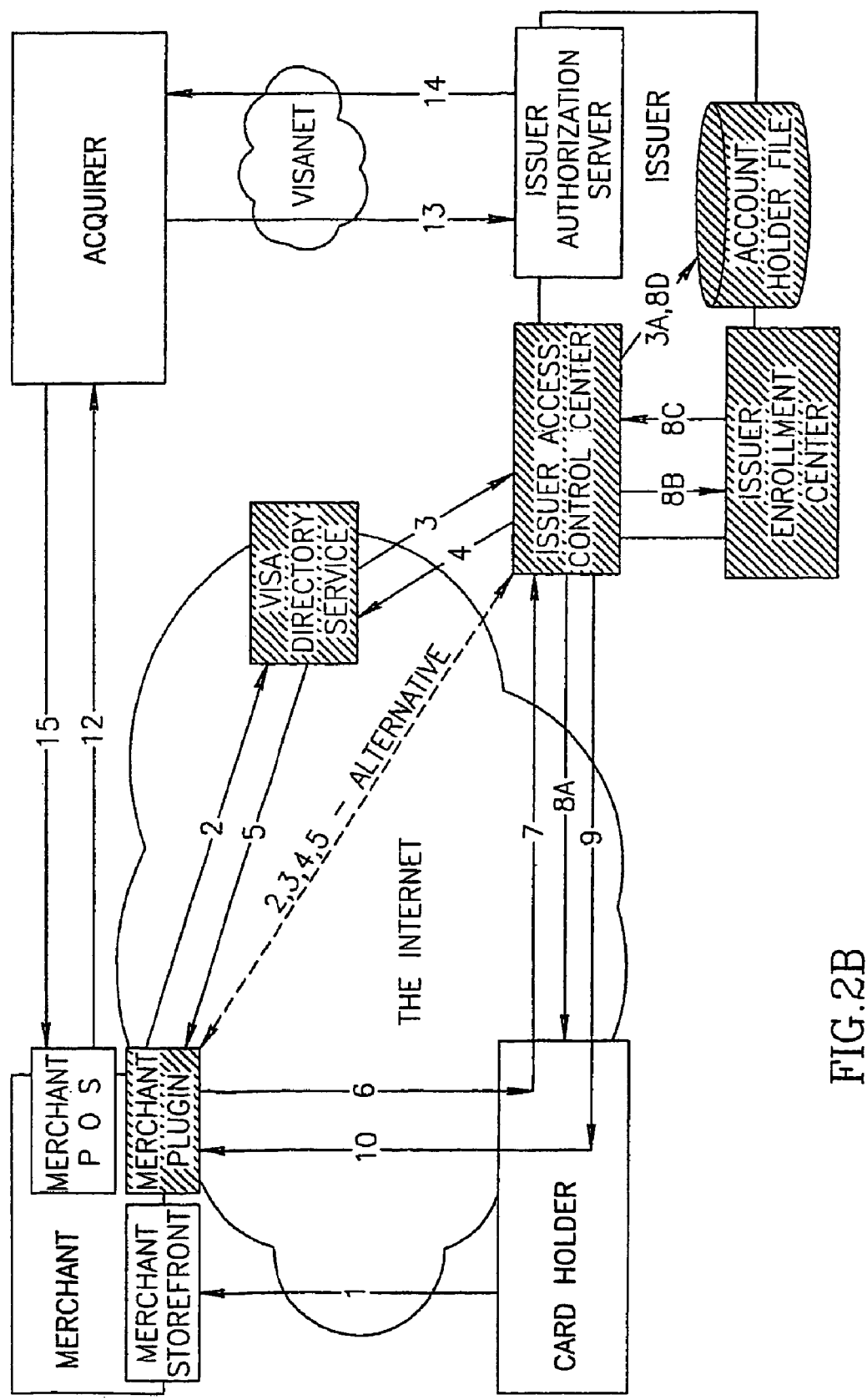
FIG. 2B is a diagram depicting on demand registration transaction flow.

In order to facilitate on demand registration, the issuer's ACS may be adapted or reprogrammed to perform in accordance with the steps shown in FIG. 2B and listed below:
   1-3. Those steps are the same as corresponding steps for the standard 3D-Secure (See FIG. 2A).
   4. The ACS sees that the cardholder is not enrolled, however formats a VERes that indicates that the cardholder is enrolled, attaching also the URL of the ACS that will later be used to register the cardholder.
   5. The VDS forwards the response to the MPI.
   6. The MPI prepares a PAReq containing all the relevant transaction receipt details, and sends them through the cardholder browser to the ACS. The details include all the payment details (PAN, expiry date . . . ), all the receipt details (merchant name and id, transaction amount and currency, transaction date, order description, etc. . . . ) and in addition the merchant's URL where a response is expected and optionally additional data needed by the merchant to resume the purchase session.
   7. The cardholder browser redirects the request to the ACS.
   8. The ACS presents the cardholder with all the relevant receipt details, but before asking him to sign the receipt, it recommends that the user enroll to 3D-Secure. The PAN of the card is implied (we get it in the PAReq). Cardholder enters information such as CVV2, billing address, email, and other optional issuer specific authentication information and selects a password to be used in the service. (8a). Information is checked against the one in file in the enrollment server or in the issuer's database. (8b) If the information matches the registration is completed by updating the account holder file with the relevant information (8c, 8d). The cardholder is informed that the registration has been completed successfully. The authentication step might finish here, as the cardholder already authenticated himself, or alternatively the cardholder might be prompted to enter his password again and continue in the normal authentication process.
   9. Steps 9-15 are the same as corresponding steps for the Standard 3D-Secure.

Registration on demand can be applied selectively, not on all the cardholders at once. A decision as to whether to register a cardholder on demand or not can be based on his financial profile, his credit card usage profile, e-commerce usage profile, 3D secure usage profile or on some other parameters.

Registration on demand can be made optional. In this case, a cardholder may be given an incentive (e.g. prize, discount, money, etc.) to register. This incentive could come from the issuer, from the merchant, from a third party (like Visa) or from both.

On demand registration might be used to register the cardholder to other services as well, or to offer him complementary products and services and to install on demand a software application. If the method is used to register the cardholder to other services or to install software on his computer, the method can also be used for cardholders that are already enrolled in 3D-Secure. In that case, the on demand action can be done either before the cardholder signs the receipt, after he's doing it or in the middle (like having a click through banner in the receipt signing screen).

As part of a Method of distinguishing between cardholders that are required to register on demand and those that are not, when getting the VEReq for an un-registered cardholder, the ACS needs to decide whether to go through a registration process or to leave the cardholder alone for this transaction. This decision can be made on a cardholder basis (not all cardholders need to be required to register at the same time) and on a VEReq basis (a cardholder doesn't need to be forced to register on his first 3D-Secure transaction). The decision can be based on the Cardholder's details obtained from the issuer, including card number range, number/volume of online/offline/e-commerce transactions the Cardholder entered into in the last number of days, and the card type (E.g. member club etc.)

Information about the Cardholder may be received from the issuer in the form of; (1) a flag field in the cardholder file that indicates this cardholder should be registered on demand, (2) a counter field in the cardholder file that tells us that this cardholder should be registered on his nth 3D-Secure transaction, and (3) a date field in the cardholder file that indicates that this cardholder should be registered on demand after this date, up to a date, and also—merchant lists. Information about the Cardholder which may be received from 3D-Secure operation includes; (1) the number of attempted 3D-Secure transactions he participated in the last number of days, (2) the sites that attempted to do a 3D-Secure transaction for this cardholder (i.e. whether it was from an adult entertainment site or from Amazon), and external data, such as (a) a random value that should pass a threshold, (b) the current date, (b) and the number/percentage of cardholders that are already enrolled.

With small changes to the MPI Software, the "registration on demand"—can take place after the transaction is complete.

Pre-Authorization

According to standard 3D-Secure operation, after the merchant gets a signed PARes message, it goes on with the regular transaction authorization and settlement procedures. This is done in spite of the fact that all the relevant transaction details are already communicated to the issuer in the PAReq message. This separation results in several problems; (1) although (from the cardholder's perspective) the transaction was already approved by himself and by the issuer, it might still be declined at the authorization stage (every declined transaction causes a lot of hassle for the cardholder, and costs more than 1.00$ for the issuer), (2) the extra authorization step takes more time (about 3-10 seconds), and costs more money (about 20 cents from the merchant and 30 cents from the issuer), (3) there is no guarantee that the transaction that will be sent to authorization will be the same as the one that was sent in the PARes for the cardholder to approve, and (4) if the transaction is about to be rejected because of insufficient funds or credit, the issuer has no chance to offer the cardholder a loan that will enable the transaction to go through. This costs the issuer in terms of cardholders loyalty (they use other cards for the transaction) and in lost loan/sale opportunities.

As part of Pre-Authorization, after receiving the PAReq message, the issuer's ACS can create an "internal" VisaNet authorization request message and sends it to its authorization server. After getting an approved authorization reply, the ACS can proceed to accept the cardholder password and return a proper PARes message. Optionally the ACS can also send the authorization code to the merchant: this step will allow the merchant to skip over the authorization phase altogether, assuming the merchant's plug-in can process this code (pass it on to the merchant's POS). If the ACS gets a declined authorization reply, the ACS can check the rejection code. If the rejection code indicates the cardholder does not have sufficient credit, the ACS can offer him an instant loan. Otherwise (or if the cardholder doesn't accept the instant loan offer), the ACS can simply display a notification to the cardholder, explaining that the transaction cannot be approved, and return to the merchant with a PARes message that indicates the cardholder authentication failed.

For the basic Pre-Authorization operation, only the ACS needs to change and an interface between it and the issuer's authorization server should be added. If the pre-authorization request is to be routed internally, some changes in the authorization server or in its routing infrastructure may be required (to enable them to receive an authorization request from within). In many cases, this won't be necessary as that capability is already in place (such as the case of an issuer who is also an acquirer, or an issuer who is processed by a processor that also processes merchants).

In addition, there is a possibility to add an interface to an instant loan service. If the merchant plug-in is to process the authorization code produced during the pre-authorization, changes are needed also in the merchant plug-in and POS.

Figure 3A:
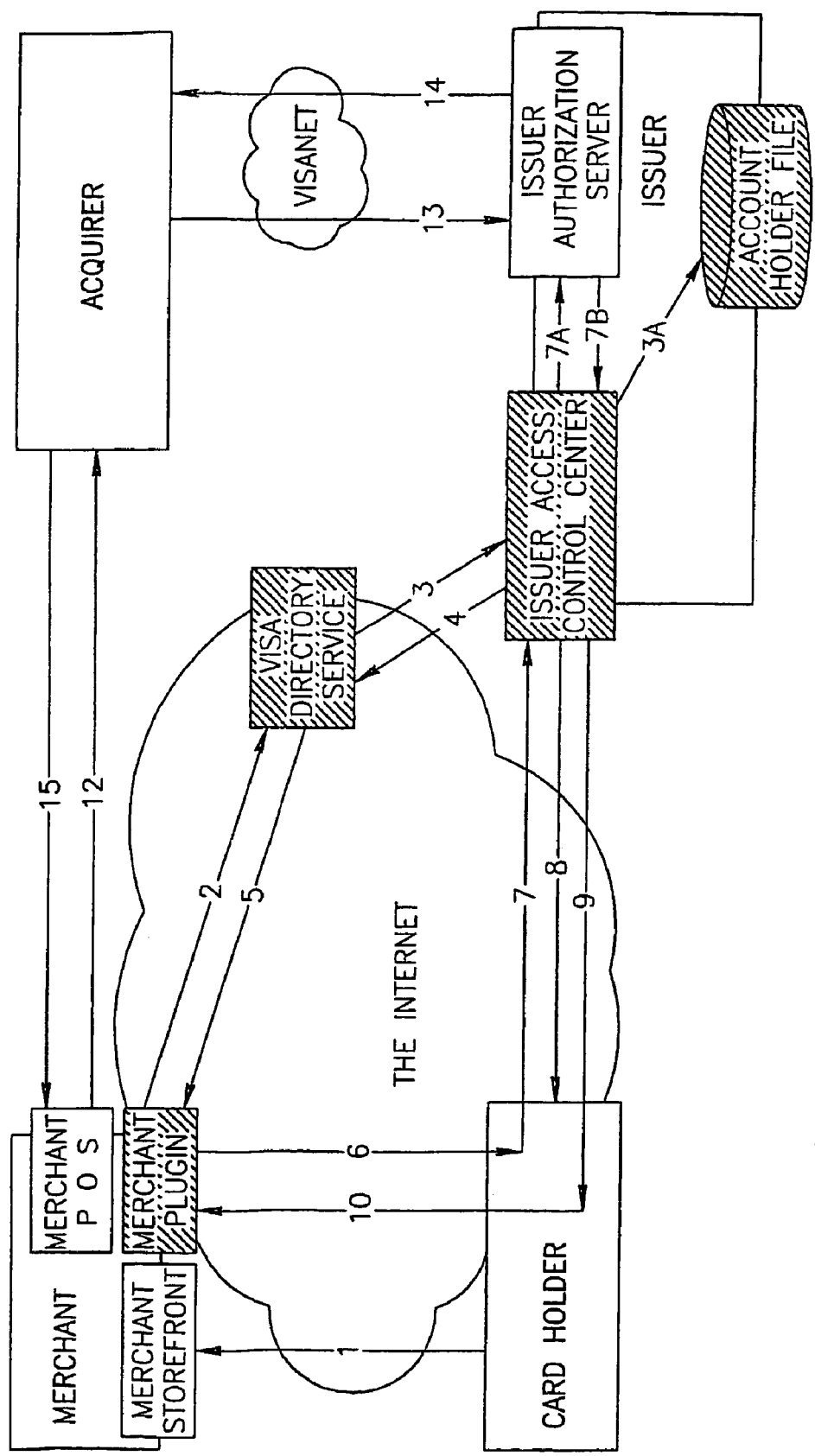
FIG. 3A is a diagram depicting Pre-Authorization transaction flow.

In order to facilitate Pre-Authorization, the issuer's ACS may be adapted or reprogrammed to perform in accordance with the steps shown in FIG. 3A and listed below:

1-6. Those steps are the same as corresponding steps for the standard 3D-Secure (See FIG. 2A).

7. The cardholder browser may redirect the request to the ACS. The ACS may create an "internal" VisaNet authorization request message and may send it to its authorization server (7a). The authorization server sends the authorization reply to the ACS (7b). Assuming the reply is positive, the ACS may continue to step 8.

8. The ACS may present the cardholder all the relevant receipt details and asks him to sign the receipt with his password. It checks the password against its Account Holder File.

9. On successful sign-in, the ACS may format a PARes message based on the details from the PAReq and sign it with its own private key. The signed PARes is sent back to the MPI through the cardholder browser. It may also contain the authorization code.

10-15. Those steps are the same as corresponding steps for the standard 3D-Secure (See FIG. 2A).

Figure 3B:
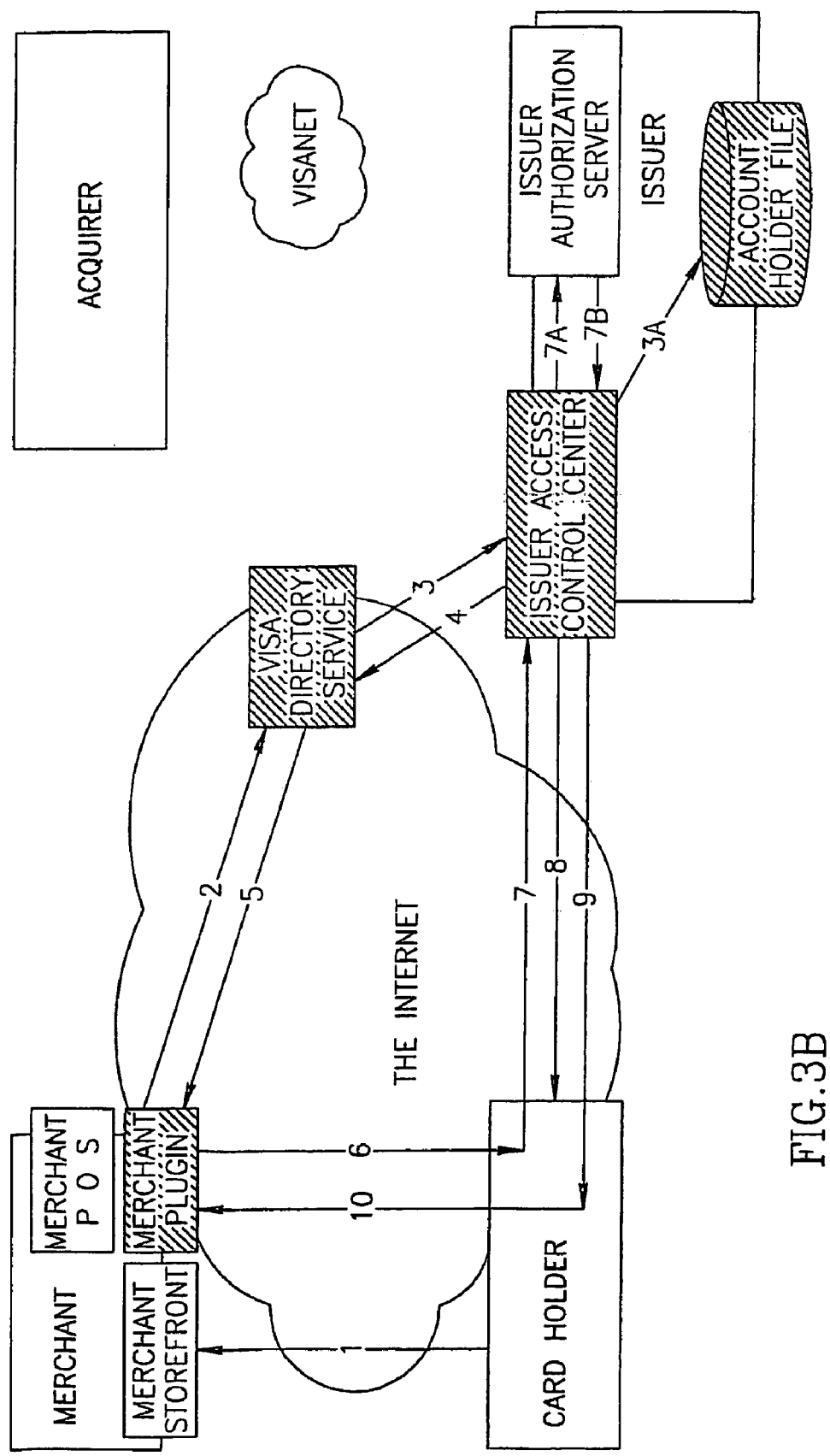
FIG. 3B shows a Pre-Authorization Transaction Flow which may occur when the Cardholder doesn't have sufficient funds for the transaction.

Turning now to FIG. 3B there is shown a Pre-Authorization Transaction Flow which may occur when the Cardholder doesn't have sufficient funds for the transaction:

1-6. Those steps are the same as corresponding steps for the standard 3D-Secure (See FIG. 2A).

7. The cardholder browser redirects the request to the ACS. The ACS creates an "internal" VisaNet authorization request message and sends it to its authorization server (7a). The authorization server sends the reply to the ACS (7b).

8. Assuming the reply is negative, the ACS can notify the user that there is not enough credit and send the MPI an unsuccessful authentication PARes (9,10) or offer an instant loan (through an online service of the issuer's). If the loan is approved the flow continues as in FIG. 3A.

Figure 3C:
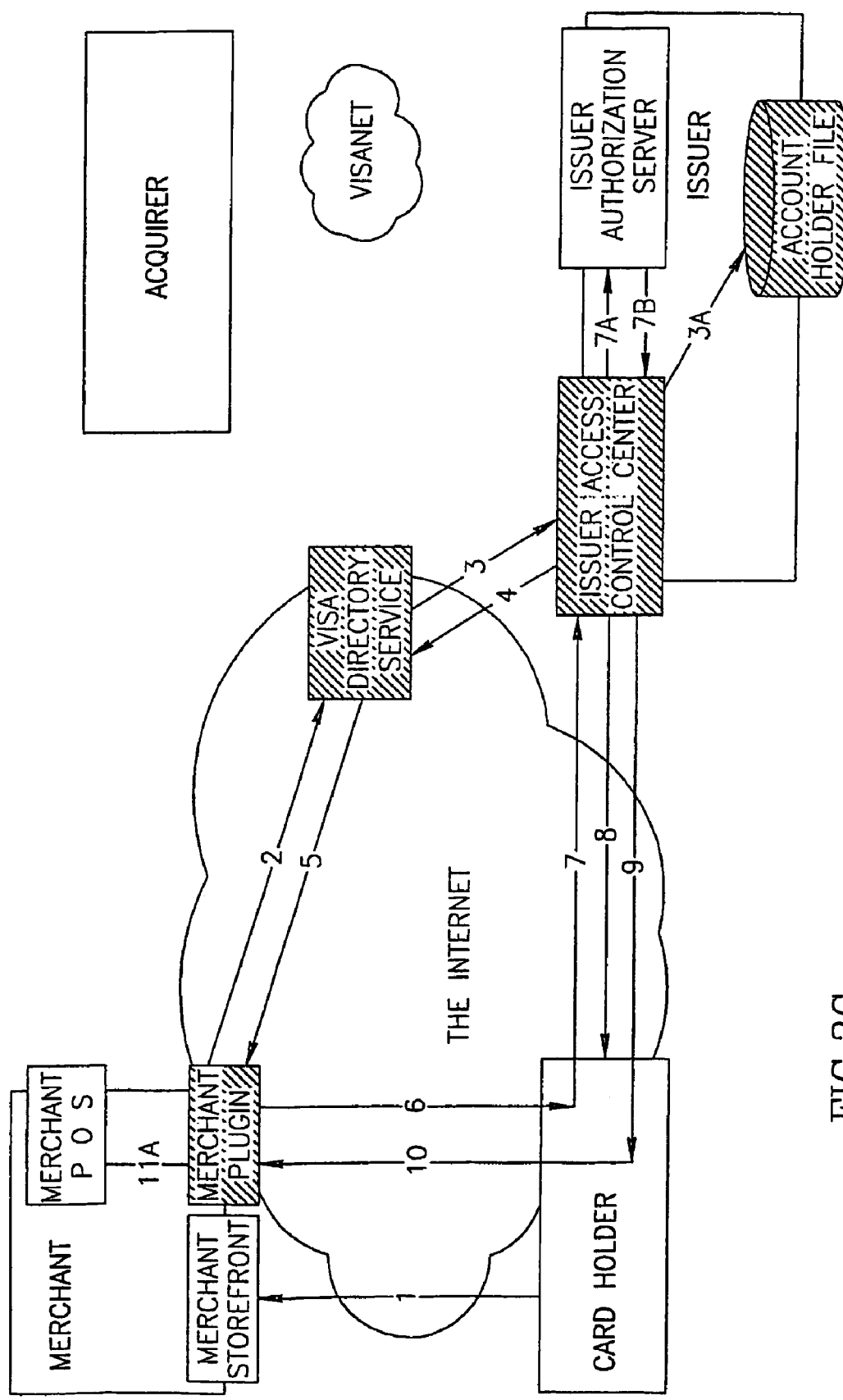
FIG. 3C shows Pre-Authorization transaction flow in the situation where the MPI Recognizes the Authorization Code.

Turning now to FIG. 3C, there is shown Pre-Authorization transaction flow in the situation where the MPI Recognizes the Authorization Code:

1-8. Those steps are the same as before.

9. The same step as before, except that here the authorization code must be transferred along with the PARes.

10-11. Those steps are the same as before.

11a. The MPI sends the transaction details (PAN, expiry, cardholder name, billing address, amount and currency), along with the authorization code it received alongside the PARes to the merchant's POS.

12-15. May be skipped now. The merchant's POS will store the authorization code as if it received it in an authorization reply, and will proceed with the settlement process using that code.

The basic pre-authorization method can be extended in the following ways: (1) when the pre-authorization is rejected because the cardholder doesn't have finds, an instant loan can be offered to the cardholder; (2) when used along with proxy numbers, the authorization response can be cached and then quickly retrieved based on the proxy number. This will make the response quicker and will reduce stand-ins; and (3) when the MPI can be adapted to receive and recognize the authorization code, and to skip the authorization step altogether. This will save approx. 50 cents per transaction (20 cents to the merchant and 30 cents to the issuer).

An internal authorization step can be either performed (as described), before the cardholder is asked to login, or performed only after the cardholder has performed a successful login. There are several methods of sending the pre-authorization request internally. For an issuer that's also an acquirer, the authorization request may be sent as if it was an on-us transaction. This can be accomplished by using a regular POS that belongs to a "dummy" merchant served by the issuer-acquirer, or by invoking the internal service responsible for handling and routing on-us transactions. The same can be done by an issuer that is processed by a processor that also has merchant side processing (like First Data Corp's FDR and FDMS). Invoking the interface/screen used to process manual authorization requests by the issuer's authorization server. Adding a new dedicated VAP (or a simulated VAP) that will not be connected to VisaNet but only to our system, and that will serve to inject incoming authorization requests' that were originated in our system. Or, invoking a special interface used to accept only those authorization requests.

In case authorization is approved and the MPI cannot process authorization codes the default would be to nothing special. Another possibility is to send an authorization reversal to cancel the first authorization request. This will serve to let the authorization server know it should get another authorization from the merchant and will make the internal calculations within the issuer's authorization server more accurate.

In case authorization is declined, there are several options: (1) Immediately return a negative PARes to the merchant. If the pre-authorization is done before getting any user input, this will look to the user as if the card doesn't work, but no authorization request will be switched through VisaNet. (2) Present a screen to the cardholder that tells him the transaction cannot be approved. If the reason of the rejection can be shown to him, it might also be shown. The cardholder will be instructed to use another card. After confirming, the cardholder will be redirected back to the merchant with a negative PARes. (3) If the issuer has the ability to offer an instant loan or an instant increase of credit limit, this can be offered now, in which case, the ACS should (a) Check if the rejection was because of insufficient funds; (b) Check if the cardholder is qualified for an extra loan; (c) Offer the cardholder the loan; and (d) If the offer is accepted, retry the authorization request after the loan is in effect.

If the cardholder is not qualified for the loan, if he doesn't want to take the loan or if the retried authorization also fails, the ACS should present the cardholder with a screen that explains the situation to him and redirect him back to the merchant with a negative PARes. As part of a method of transferring the authorization code to the MPI, additional fields, such as the authorization code field, can be transferred in two ways either using the "Extensions" field in the PARes message or by using an additional posted field in the HTTP request.

After the MPI receives the authorization code, there are several ways the transaction may be processed. The order may be inserted into the order database as if it was already authorized, along with all the required details for such a record. Optionally the record can have an indicator that the method of authorization was 3D-Secure pre-authorization. The order processing application can then continue as usual in the clearing of the transactions. The order may be passed to the POS along with the authorization code, to indicate it was already authorized (if the POS supports that mode). The order may be passed to the POS in a "capture only mode" (if the POS supports that mode). The same process as the one used in case the transaction is authorized manually may be used. Note that in a manual authorization scenario, the operator at the merchant side is supposed to enter the authorization details into some screen and from that point, the transaction continues normally. Or, a special purpose POS interface may be used that skips the authorization step.

Using a Client Application ("CPI")

Using a server based user interface has certain advantages including ease of registration process. It offers a solution to situations in which the cardholder needs to make a transaction from a computer that doesn't allow client installations, or when the cardholder isn't interested in installing the client application or plug-in.

However, the server based wallet may not allow for added value services like form filling, persistent issuer branding and promotion and, maybe above all, is vulnerable to the "attack in the middle" method for stealing cardholders' passwords. Using a client application as the user interface may prevent the "attack in the middle" because a fraudulent site cannot produce a user interface that looks like the client, and so will not be able to prove the issuer's identity. At the same time, such a client will allow the issuer to provide added value services to the cardholder and to achieve persistent branding and presence on the cardholder computer. Also, if this client uses extra security it makes the cardholder authentication itself stronger.

Upon registration to the 3D-Secure service, the cardholder may also download a client plug-in into his computer. He may also have a client already for a different service and download only an addition that handles 3D-Secure transactions. This plug in may serve as the sole ACS interface point with the cardholder during the authenticated transaction flow. When the MPI sends the PAReq, the user client may pop-up and grab it, and display all the relevant receipt details to the cardholder, asking him to sign the receipt with his password. The client may then send the PAReq and the cardholder password for authentication in the ACS, which may check the password against its Account Holder File, and may sign the receipt and will format and return the appropriate PARes.

To convert a standard 3D-Secure to one using a client application according to the present invention, the only components which needs to be added is the Client Plug-In (CPI). For the basic operation, the ACS may also be modified so that in the registration step, the client is downloaded as well. There may be no difference in the ACS handling of the payer authentication step. Note that the ACS will normally communicate with the CPI, but should also be able to behave in the normal way, in case the cardholder makes a transaction at another computer where he either didn't install the client before, or even where he is not able to install a client (like in an Internet cafe? or in some working environments). If the use of a CPI is mandatory, the ACS should be changed so that it won't accept normal PAReq, but only those in another format that's sent by the client. In an alternative implementation, the ACS might have two different interfaces, one normal for a non-client environment and the other one specially suited for communicating with the CPI.

Figure 4A:
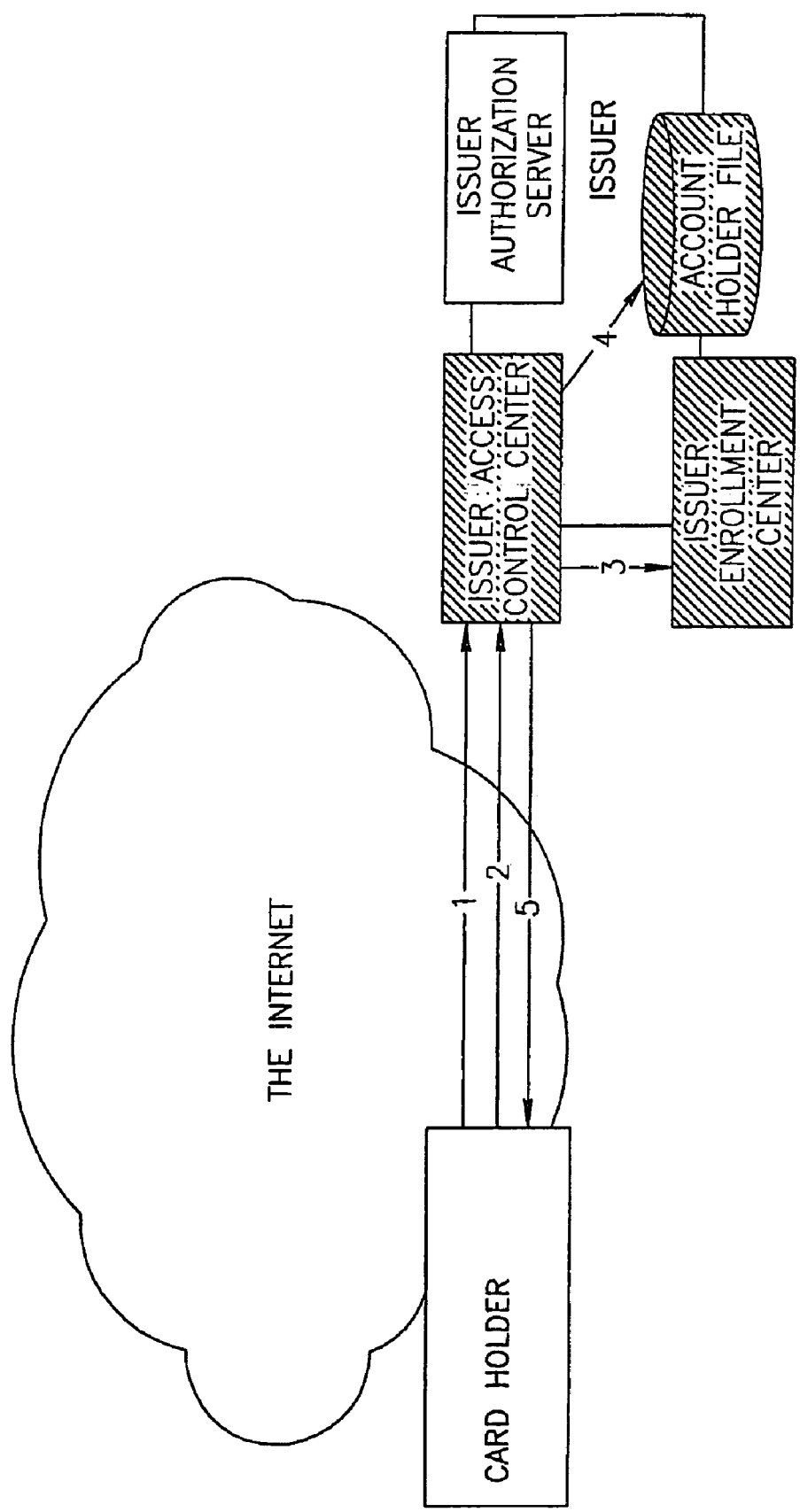
FIG. 4A is a diagram depicting the steps of an application registration and installation process.

Turning now to FIG. 4A, there is shown a diagram depicting the steps of a registration and installation process. This is an example of the steps by which a cardholder may be enrolled in the 3D-Secure service including a client application installation:

1-4. Those steps are the same as before.
5. The CPI installer is downloaded to the cardholder's computer and installed on that computer, and the cardholder is informed that the registration completed successfully.

Alternatively, the client can be installed before the cardholder completes the registration forms.

Figure 4B:
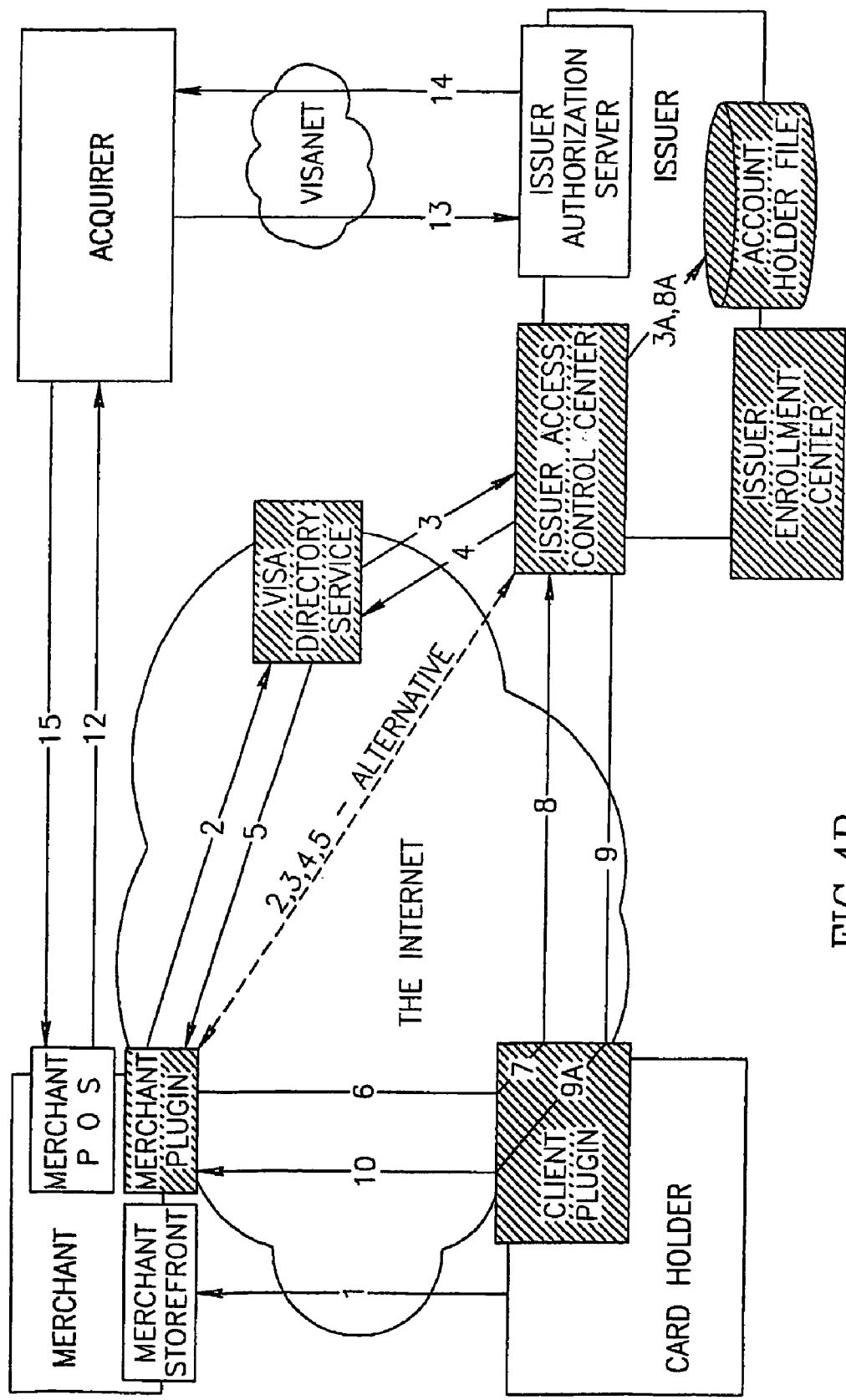
FIG. 4B shows a diagram depicting a possible transaction flow using a client application.

Turning now to FIG. 4B, there is shown a diagram depicting a possible transaction flow using a client application. Listed below are the steps which may be performed by each of the entities participating in the transaction:

1.-6. Those steps are the same as before.

7. The CPI recognizes that the browser is redirected to the ACS. This can be recognized by interception of the browser navigating to a URL of one of the ACS.

The CPI then grabs the PAReq from the relevant posted HTTP fields and stops the browser navigation.

8. The CPI pops-up it's user interface and presents the receipt details to the cardholder for signature. It gets the cardholder's password, which it sends, along with the PAReq for authentication to the ACS. The ACS checks the password against its' Account Holder File (8a) and replies to the client upon successful login.

9. The CPI receives the PARes and navigates the browser to the merchant's Term URL with the PARes and MD fields posted (9a).

10-15. Those steps are the same as before.

Figure 4C:
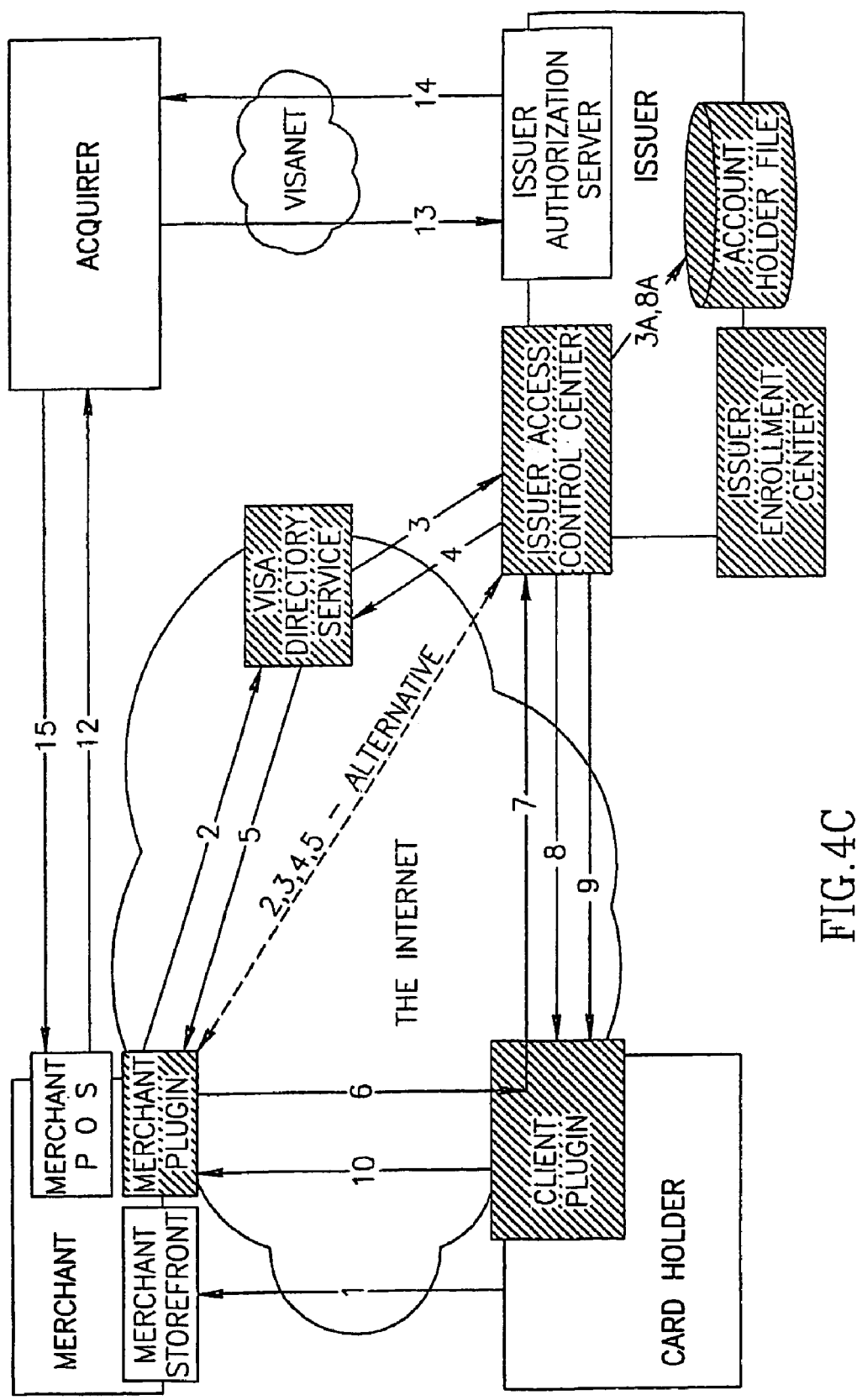
FIG. 4C shows a diagram depicting "Client Enabled" transaction flow where the client Plug-In is installed on demand.

Turning now to FIG. 4C, there is shown a diagram depicting "Client Enabled" transaction flow, where the client Plug-In is installed on demand. This is an optional additional feature. It is relevant for the case the cardholder that's using a client enabled 3D Secure is making a transaction from a computer that doesn't have a client installed. The steps are:

1-7. Those steps are the same as before.

8. The ACS recognizes that it just got PAReq directly from the merchant (and not through a client). In response, it offers (or mandates) the user to download and install the CPI. Now there are several options:
   i. If the installation is optional and the user doesn't want (or can't) perform the install, the transaction continues as a regular 3D secure transaction
   ii. If the installation is mandatory and the user doesn't want (or can't) perform the install, the ACS builds a negative PARes and redirects it to the merchant's Term URL.
   iii. If the user accepts the installation, the CPI is installed on the user's computer and it gets as a parameter the PAReq, the TermURL and the MD. The transaction continues as if the CPI was installed in the first place.

The client application may also perform other functions, such as those frequently used by electronic wallets (form filling, password storage, address book handling etc.). The client may be used to enhance the cardholder authentication (for example, by supplying the ACS with a certificate stored on the local machine, with some other form of secret information stored on the local machine or by supplying identifying information on the local machine).

The client application may also be combined with any of the other features described (e.g. pre authorization). In the event the client application is used together with on demand registration, the on demand registration step may also include an on demand installation step. In case the client application is used together with instant messaging integration, it can act as the instant message agent. In the event the client is used together with a proxy number system (describer below), it can serve as the user interface of both systems. In this case, the client may provide the cardholder with the proxy number in the form filling stage, and then pop up to sign the receipt in the PAReq stage.

The client can be used as the sole means of accessing the ACS, in which case the ACS won't accept plain PAReq but only those flagged as originating from a client application. If the ACS receives a plain vanilla PAReq, it should respond with a negative PARes (or alternatively, offer an on demand installation of the CPI).

Alternatively, the client application may be the preferred way to access the ACS, but the cardholder can also access the ACS directly. In this case the ACS may accept both plain PAReq and client originated PAReq. This will enable the cardholder to make transactions from computers on which he cannot install the client (e.g. internet cafes, set-top boxes, workplaces that do not allow clients to be installed, etc. . . . ).

The ACS can differentiate between regular and CPI originated PAReq by one of the following methods:

1. The CPI originated PAReq may contain an additional field.
2. The CPI originated PAReq may go to a different URL. In this case the URL provided by the VERes will only serve to signal the CPI that a PAReq is being sent, and the real ACS URL will be known by the client (or will be computable from the first URL by the client). The URL provided by the VERes will still be handled, but by either sending a negative PARes (in case the client is mandatory and there is no on demand installation), or by initiating an on demand installation.
3. The CPI originated PAReq may be signed using a private key stored in the client and/or encrypted using a key stored in the client.
4. The CPI originated PAReq may be in a different format.

The CPI can intercept PAReq by either: (1) Listening to browser navigation events and intercepting those events that indicate the browser is going to a URL of a ACS; (2) Listening to browser navigation events and intercepting those events that indicate the browser is posting one or all of the PAReq fields (like PAReq, Term URL and/or MD); or (3) Registering as a specific MIME viewer and having the MPI sending to the browser a response with this MIME type (May requires a change in the standard configuration of the MPI).

The interface between the CPI and the ACS can either be the normal interface provided by the ACS, or be a different interface. In a first case, the CPI may send HTTP requests to the ACS as if it was a browser, may get the HTML pages in response and may use its knowledge on the structure of the ACS pages to proceed with the transaction. This option might cause a problem if the structure of the ACS pages changes (i.e. when the user interface look and feel is changed).

In a second case, another interface may be defined especially for the CPI. This may allow for the use of a simpler, more stable interface. Preferably, this interface will still use HTTP as a transport protocol, but it can use stable and simple messages based on XML (or a similar format).

The ACS can support on demand installation in case it gets a plain PAReq with an enrolled PAN (an event indicating the cardholder is trying to make a transaction at a 3D-Secure merchant from a computer with no client installed). Support for on demand installation might open the system to a subtle "attack in the middle" where a fraudster tries to persuade the client to install a Trojan horse instead of the client. This risk can be reduced by the usage of a signed component (CAB, JAR or executable ActiveX component) to install the client.

Handling Auctions Using Email

The 3D-Secure protocol assumes that the full receipt details are available while the cardholder interacts with the merchant. This is not the case in some popular purchase flows such as (a) auction site bids (the receipt will be ready only when the bids close), and (b) Amazon's one-click buy, where the receipt will be ready only an hour after the last item was added. In these cases, the cardholder is not sitting in front of the computer when the receipt is ready, and so there is no one to sign the receipt. Even if the merchant may try to redirect a PAReq message, there probably won't be a browser to redirect the message with, nor will there be any user sitting in front of the computer and ready to complete the transaction. The 3D-Secure protocol alone is thus not suited for these types of transactions.

This situation might be solved by the merchant sending an email with a link, where the cardholder needs to click through in order to complete the transaction. This is what is already happening today with some auction sites (such as Amazon Auctions), but it's not the case in most such sites. If the merchant does that, there is still a risk that the cardholder won't notice that he needs to do something active in order to complete the transaction and the transaction may never be completed. For the transactions mentioned directly above, an external event occurs after the cardholder finishes interacting with the site, and causes the transaction to be committed. In auction transactions this event occurs when the auction is closed and the cardholder's bid is accepted. In the one-click-buy transactions the closing event occurs when enough time has passed since the last item was purchased (1 hour in Amazon's case).

When that event happens, the merchant often sends an email to the cardholder's email address with the transaction details and instructions on how to proceed. Usually this email is for informational purposes only, and the cardholder is not required to do anything active in order to proceed. In the 3D-Secure flow, the merchant will first send a VEReq to the VDS to determine if the cardholder is registered with the service. If the cardholder is not registered, the regular email will be sent. If the cardholder is registered, a different email will be sent, with a link to a web page that will complete the transaction.

When the cardholder goes through the link, his local browser will be activated and the web, page will be downloaded to the browser. The web page will redirect the cardholder to the ACS with the proper PAReq. The transaction continues as a normal 3D-Secure transaction. If the cardholder doesn't click through the link for some time, the merchant can still process the transaction, even though he will need to process it as a non 3D-Secure transaction (which means he will lose any advantages associated with 3D-Secure, such as lowered transaction fees or guaranteed payments).

The only component that needs to be changed is the MPI (along with the relevant merchant's storefront and back-office systems). The method is transparent to all the other 3D-Secure components.

Figure 5A:
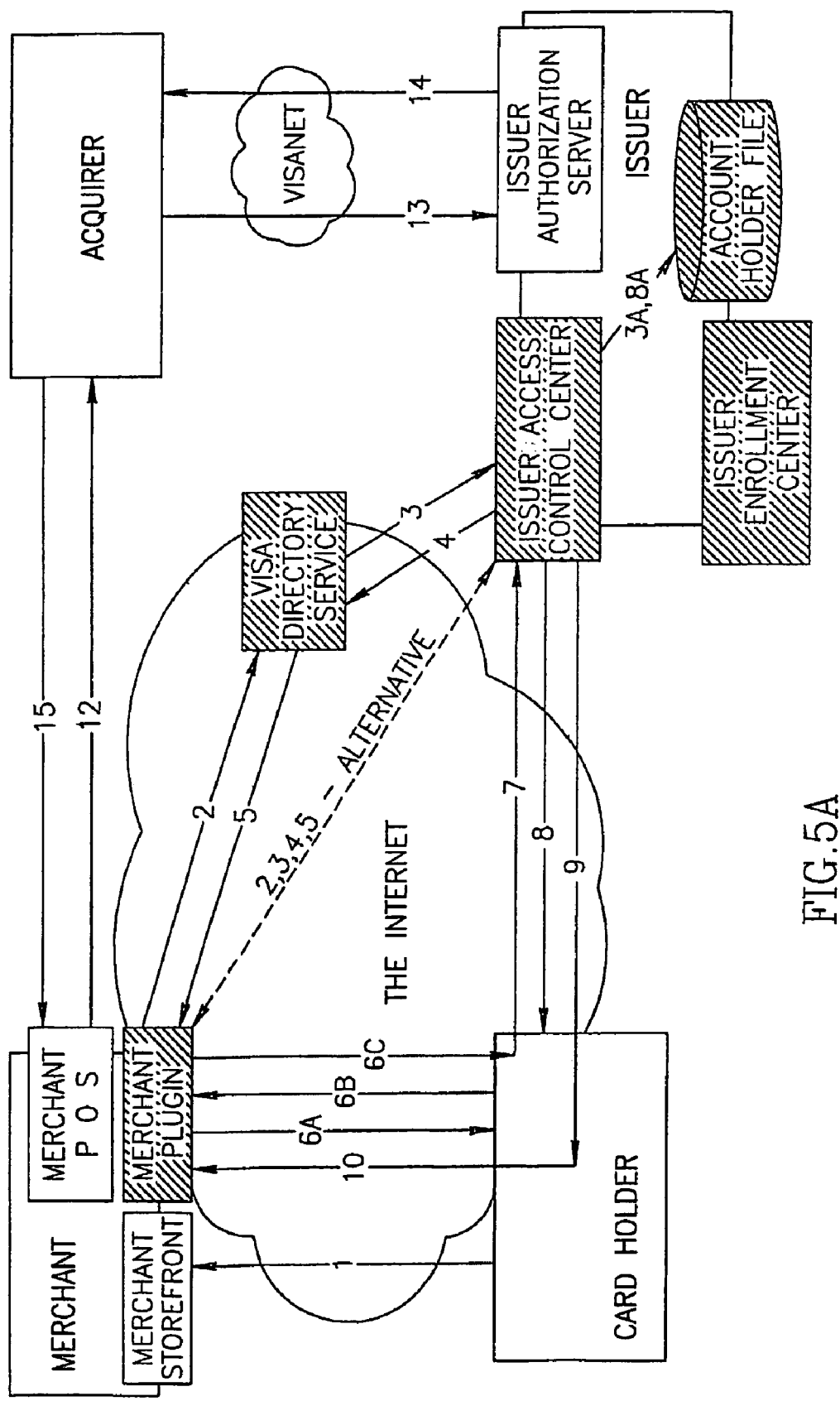
FIG. 5A shows a transaction flow of a transaction completed via email.

Turning now to FIG. 5A, there is shown a transaction flow of a transaction completed via email, as described above. The steps depicted in FIG. 5A are:

1-5. These steps are performed the same way as before, except that steps 2-5 are performed only when the merchant decides the transaction is committed.

6. The MPI sends an email to the cardholder with a link back to a web page on the MPI (6a). The link will contain an identification of the transaction. The cardholder will click through the link (6b), activating his local browser and downloading a web page from the merchant (6c). That page will be constructed based on the transaction identification information sent through the link. That page will contain the PAReq, along with the Term URL and MD information and a JavaScript script that will redirect the PAReq to the ACS.

7-15. The rest of the transaction continues in the same way as before.

Figure 5B:
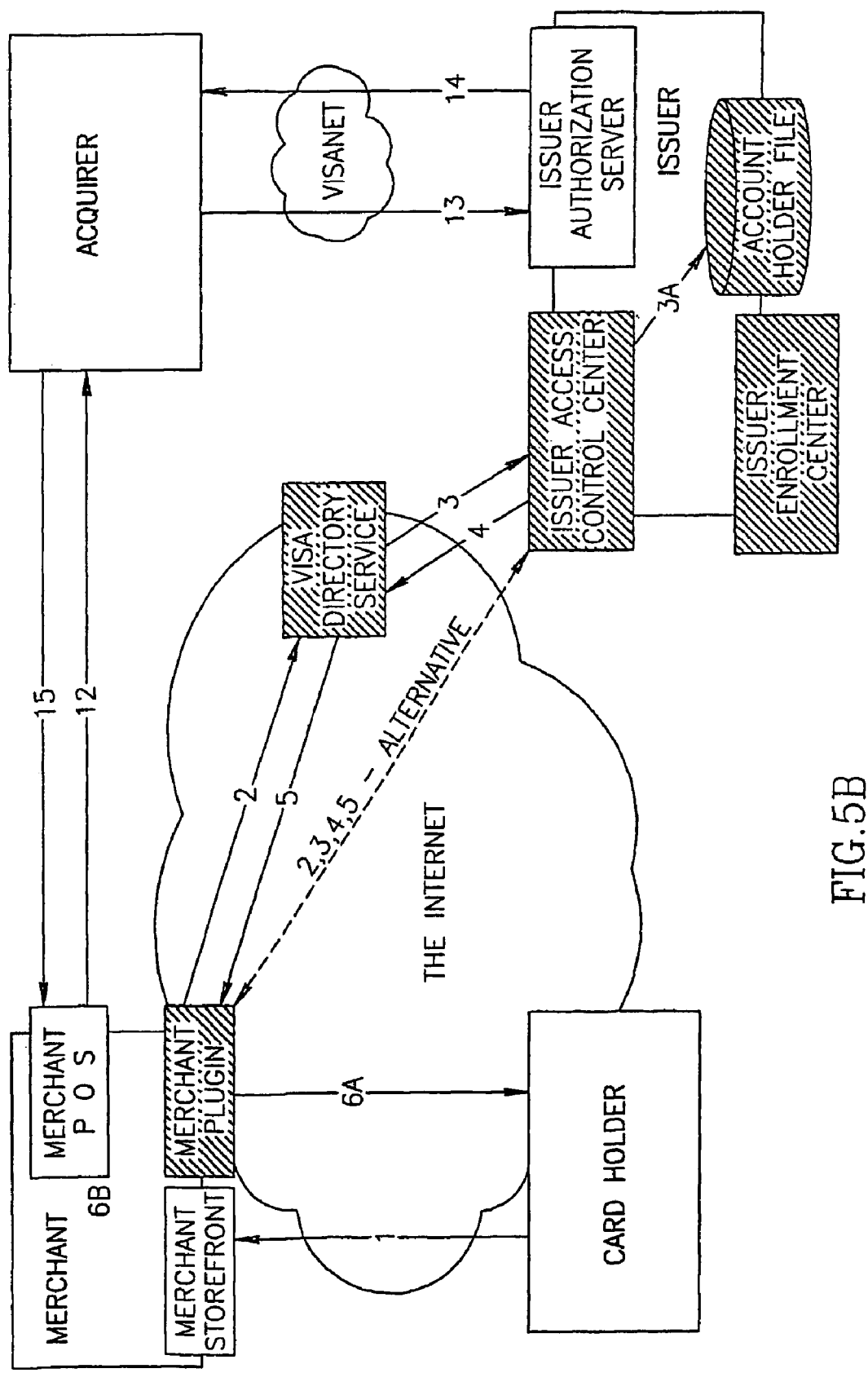
FIG. 5B shows the steps of a transaction via email where the cardholder does not click-through the email.

Turning now to FIG. 5B, there are shown the steps of a transaction via email, where the cardholder does not click-through the email. The steps of the transaction shown in FIG. 5B are:

1-5. These steps are performed the same way as before, except that steps 2-5 are performed only when the merchant decides the transaction is committed.

6. The MPI sends an email to the cardholder with a link back to a web page on the MPI (6a). Time passes and the cardholder doesn't do anything. The merchant notices that the cardholder didn't do anything, and decides to proceed with the transaction anyway.

7-11. These steps are not performed in this scenario.

12-15. These steps are performed as in a normal (non 3D-Secure) transaction.

Getting the cardholder's attention to the email may be achieved by either: (1) Specifying the fact that something active is required in the mail's subject line. Instead of having a subject line like "Your order #100993301 at Amazon.com", have something like "Your order #100993301 at Amazon.com—click through to complete the transaction"; (2) Sending an HTML email with JavaScript, that will automatically redirect the cardholder to the web page. or (3) Sending an HTML email with JavaScript, that will make it more visible, using animation, that something active is preferred.

Handling Auctions Using Instant Messaging

An instant messaging agent, such as a Yahoo Messenger/AOL Messenger/ICQ program, a wallet client that supports instant messaging or a mobile wireless device may facilitate auctions and one-click-buy transactions in the same manner as would emails (describer above). However, instant messaging may also prevent "attack in the middle" at the same time. During registration to 3D-Secure, a cardholder may also download an instant messaging agent, or opt to use in an existing agent on his computer. The messaging agent may be integrated into a client application or CPI as described above.

The instant messenger received message from the merchant web site, containing links or instructions on where to go finalize the transaction. These messages are analogous to the emails described above.

Matching Receipt Data in Authorization

Currently, the 3D-Secure process is totally separate from the authorization process. In addition to the possibility to pre-authorize all transactions, there is also a possibility to make sure that the transaction that is sent for authorization is the same as the one that was sent in the PARes for the cardholder to approve. By using a receipt comparison module, the issuer can make sure the financial transaction initiated by the merchant is based on the purchase approved by the cardholder. The Issuer may also make sure that no one uses the payment information without the cardholder's approval. This way fraudulent transactions may be rejected immediately, the cardholder may be relieved from the hassles of canceling those transactions and the issuer may reduce its chargeback processing expenses.

During the creation of a PARes, the ACS may also store the content of the receipt in the Receipt File for future use. When the authorization request arrives at the issuer, it may be forwarded to the ACS for an extra validation check. The ACS may locate the matching receipt, and compare the receipt details with the financial transaction, checking for any discrepancies. The issuer may choose not to approve a transaction that fails this validation test.

Several components may need to be adapted for matching. First, some routing component in the authorization stream should be added, changed or configured to identify and route the relevant transaction. Next, the receipts should be kept in a Receipt File in a format that would allow efficient matching against incoming authorization requests for validation. Last, to actually match the authorization to the relevant receipts a new validation server should be added, or the capability should be added to the ACS. Optionally, the ACS might be changed to return some details in the PARes that may correlate the receipts and its corresponding authorization requests.

Figure 6A:
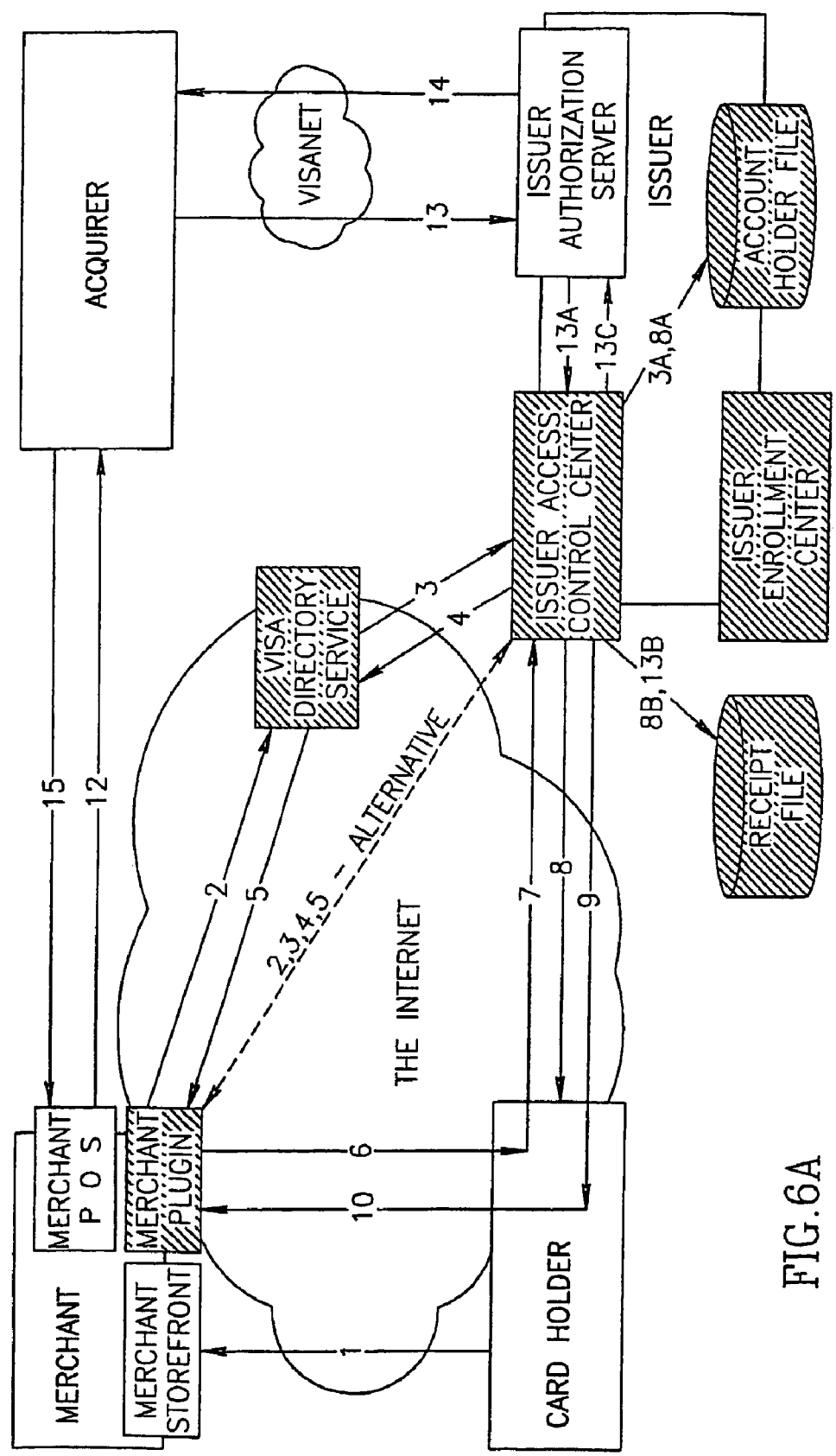
FIG. 6A shows a transaction flow where a receipt and its corresponding authorization request are compared.

Turning now to FIG. 6A, there is shown a transaction flow where a receipt and its corresponding authorization request are compared. The steps are:

1-7. Those steps are the same as before.

8. The ACS presents the cardholder all the relevant receipt details and asks him to sign the receipt with his password. It checks the password against its Account Holder File (8a), and records the details of the receipt in the Receipt File (8b).

9-12. Those steps are the same as before. 13. The acquirer forwards the authorization request to the issuer through VisaNet. The transaction is routed to issuer's authorization server. The authorization server identifies that this is a 3D-Secure transaction and forwards the request to the ACS (13a). The ACS matches the authorization request against the receipt stored in the Receipt File (13b) and assuming the two matches within a reasonable tolerance, returns a positive response to the issuer's authorization server (13c).

14. The issuer can check now that the regular conditions for authorization are fulfilled: that the account number is valid, that there are enough funds/credit, etc. If all is well, the issuer sends an "approved" authorization response to the acquirer. If something is wrong, it sends a "declined" authorization response.

15. The acquirer sends the authorization response back to the merchant. The transaction is authenticated and authorized.

Figure 6B:
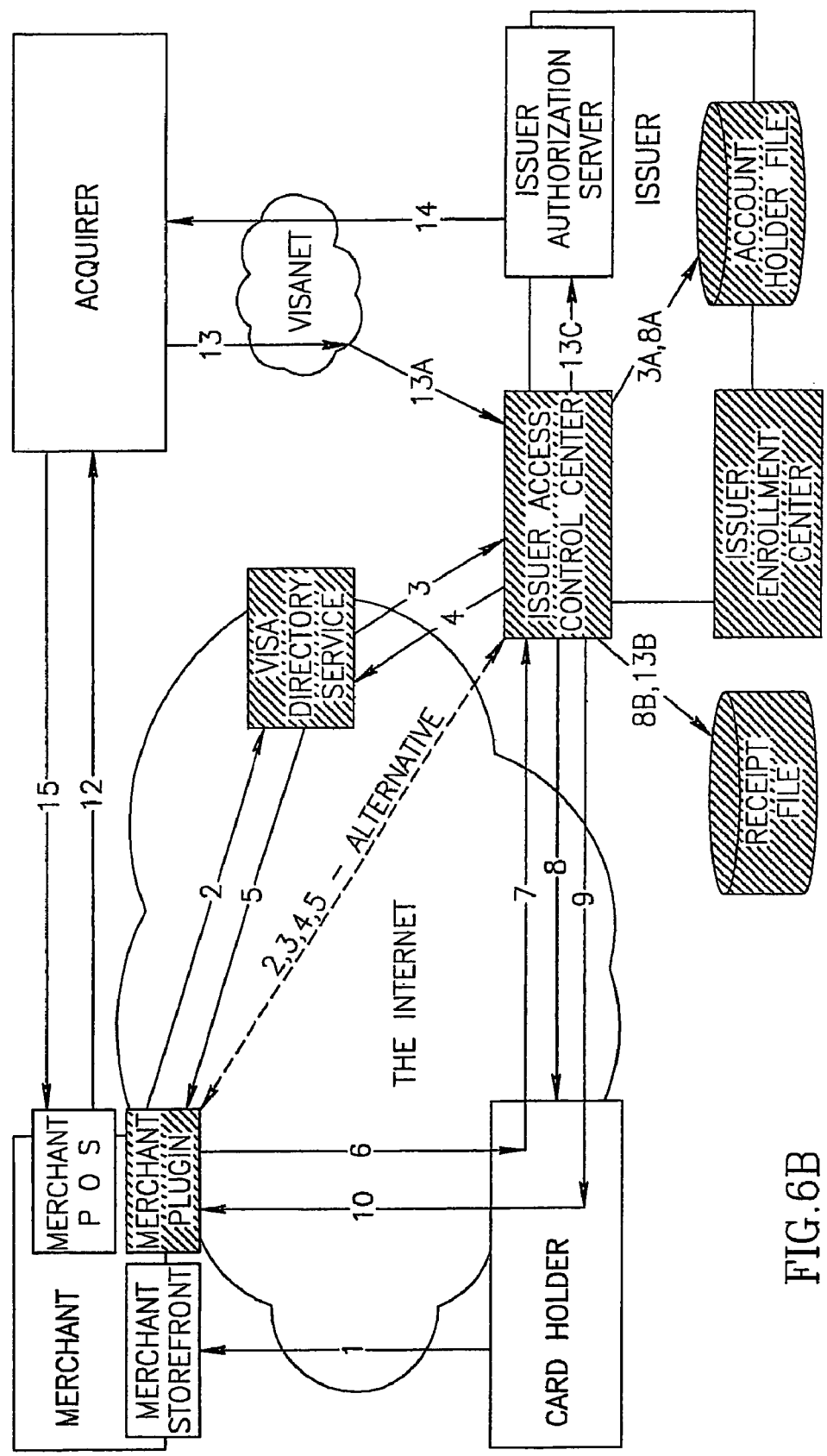
FIG. 6B shows a transaction flow where a receipt and its corresponding authorization request are compared and the Authorization Stream is split using Visa routing capabilities.

Turning now to FIG. 6B, there is shown a transaction flow where a receipt and its corresponding authorization request are compared and the Authorization Stream is split using Visa routing capabilities. This method uses Visa routing capabilities to split normal transactions from 3D-Secure transactions. This requires the 3D-Secure enabled cards to be in a specific card range for 3D-Secure cards only, and to be used for 3D-Secure transactions only. These cards can either be separate cards issued for this purpose, or proxy numbers (static or changing for each transaction) that translates back into the PAN. The steps are:

1-7. Those steps are the same as before.

8. The ACS presents the cardholder all the relevant receipt details and asks him to sign the receipt with his password. It checks the password against its Account Holder File (8a), and records the details of the receipt in the Receipt File (8b).

9-12. Those steps are the same as before.

13. The acquirer-forwards the authorization request to the issuer through VisaNet. The transaction is routed by Visa based on the card number range to the ACS (13a). The ACS matches the authorization request against the receipt stored in the Receipt File (13b) and assuming the two matches within a reasonable tolerance, forwards the authorization request to the issuer's authorization server (13c).

14. The issuer gets the authorization request and checks that the account number is valid, that there are enough funds/credit, etc. If all is well, the issuer sends an "approved" authorization response to the acquirer. If something is wrong, it sends a "declined" authorization response.

15. The acquirer sends the authorization response back to the merchant. The transaction is authenticated and authorized.

The basic method comparison method can be extended by integrating it with a dynamic proxy number system, to eliminate exposure of the real PAN, while making it easier to match the receipt with the authorization request (based on the proxy number as an index). Also, a customer service interface for the retrieval of the receipts can be added.

There are a few possible options for the interception of the relevant authorization requests and the routing of them to the ACS. Using Direct Host Integration, the issuer's authorization server is responsible to identify which transactions are 3D-secure and route them to the ACS. The transactions could be identified based on special values in the ECI, EMC, TCC or Transaction Stain fields, which could be set by the PARes message, or by having different numbers for cards that are used in 3D-Secure transactions. Using Authorization Proxy Server, a special proxy is placed between VisaNet and the issuer's authorization server. This server will look to the authorization server as if it is the VisaNet's VAP, and to VisaNet as if it is the authorization server. The proxy server then check whether the transaction is a 3D-Secure one, and if it is, forwards it to the ACS for validation. The transactions could be recognized as 3D-Secure based on a field (ECI, EMC, TCC, Transaction Stain) or based on the number range.

Authorization Stream Splitting using Visa routing capabilities may be accomplished by having a unique BIN or card number range used specifically for 3D-Secure transactions. VisaNet routers may be configured to route the authorizations to a specific VAP. That VAP will then forward the requests to the ACS for validation. This method may prevent non 3D-Secure transactions from passing through the 3D-Secure system, reducing the initial risk of failure and reducing the initial system size needed for operation.

Loyalty Program Management

Currently issuers are offering many kinds of loyalty programs, which are all based on a simple principal—the more the cardholder uses the credit card, the more rewards the cardholder gets. These loyalty programs can come in the form of mileage, cash bonuses, discounts, gift coupons and more. Currently each issuer has to either maintain multiple merchant relationships or offer a limited and specific loyalty program. The costs of running such programs are very high, and they are complicated and not flexible. 3D-Secure creates an opportunity to create a strong loyalty program, which will be applicable in multiple merchant sites, simple and flexible, because there is a direct connection between the merchant and the issuer during the transaction.

As part of the present invention, during a 3D-Secure transaction, The MPI sends a VEReq to the VDS (or directly to the Issuer's ACS if the MPI knows the ACS's URL.). In addition to the required fields of this request, the merchant can also send information regarding the amount of discount it is willing to give on that specific purchase, and on what cost. The issuer may send its response to the merchant in the VERes. The discount may be displayed to the user as a joined offering of the site and the issuer.

As part of the present invention, there may be additional fields in the VEReq and the VERes, and also in the PARes and PAReq, where the details of the deal may be signed on by the issuer. The ACS/merchant site should be able to display the special offer, co-branded by the issuer and the merchant. The issuer needs to be able to process this transaction while considering the agreed offering when debiting the cardholder.

Figure 7:
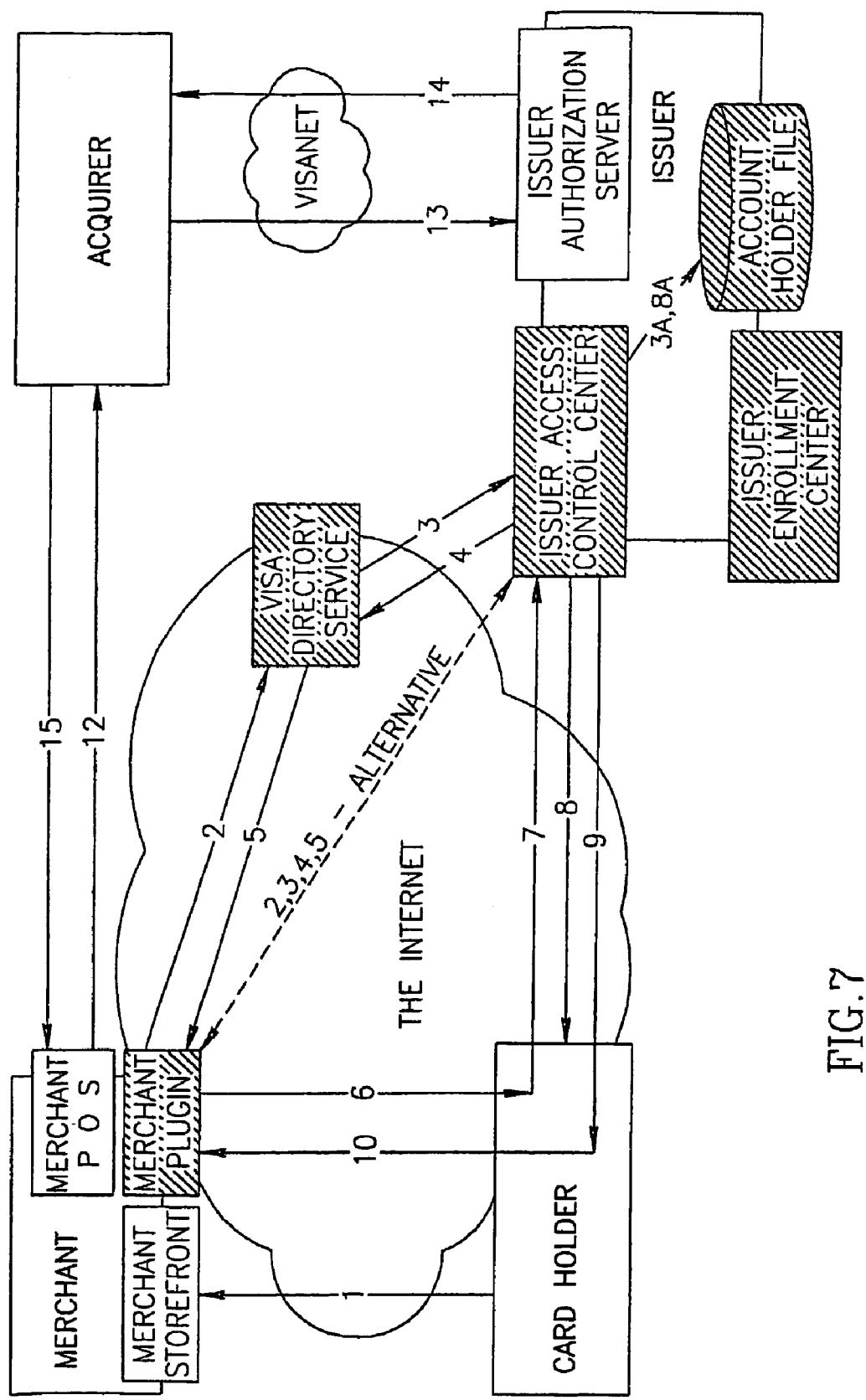
FIG. 7 shows a possible transaction flow for a loyalty program.

Turing now to FIG. 7, there is shown a possible transaction flow for a loyalty program. The steps are:

1. Cardholder browses merchant site, selects merchandise, checks out, selects payment method and provides payment information. At this stage everything is ready for the cardholder to receive a receipt.
2. The MPI sends a VEReq to the VDS (or directly to the Issuer's ACS if the MPI knows the ACS's URL.). The VEReq contains the payment card number (the PAN). In this flow it will also include the offered deal by the merchant, for example 10% discount for the purchase for 50 cents from the issuer—The VDS queries its internal database for a card number range that contains the PAN and forwards the request to the associated ACS.
3. The ACS receives the VEReq and checks (a) its Account Holder File to see if the cardholder is enrolled.
4. The ACS sees that the cardholder is enrolled, The ACS formats a VERes that indicates that the cardholder is enrolled, attaching also the URL of the ACS that will authenticate the cardholder. It will also approve or decline the suggested deal.
5. The VDS forwards the response to the MPI.
6. The MPI prepares a PAReq containing all the relevant transaction receipt details, and sends them through the cardholder browser to the ACS. The details include all the payment details (PAN, expiry date . . . ), all the receipt details (merchant name and id, transaction amount and currency, transaction date, order description, etc. . . . ) and in addition the merchant's URL where a response is expected and optionally additional data needed by the merchant to resume the purchase session. The details will change according to the offering decided upon by the issuer and merchant.
7. The cardholder browser redirects the request to the ACS.
8. The ACS presents the cardholder all the relevant receipt details and asks him to sign the receipt with his password. It checks the password against its Account Holder File. It also presents the discount in a co-branded frame of the issuer and the merchant.
9. On successful login, the ACS formats a PARes message based on the details from the PAReq and signs it with its own private key. The signed PARes is sent back to the MPI through the cardholder browser. The signature also approves the deal between the merchant and the issuer.
10. The cardholder browser redirects the request to the MPI.
11. The MPI checks the signed receipt making sure the details match; that there is a signature and that the key that signed it was issued by the right authority. If all goes well, the payer identity is authenticated.
12. After the MPI sees that everything is ok, it passes the payment-processing job to the POS, which initiates an authorization request and sends it to the acquirer, using the amount after discount.
13-15. Those steps are the same as before.

The issuer can employ existing or additional loyalty programs in this method. If, for example, the cardholder has accumulated a certain amount of loyalty points, the issuer can check it when the VEReq arrives, and decide what amount of loyalty points will be deducted from the cardholder should he accept. The loyalty programs can also be set in advance by the issuer or the association, and offered on each request to the issuer—simply in order to make their implementation easier (for a 3D-Secure merchant there are hardly any changes for this scheme).

Proxy Number Integration

The 3D-Secure protocol does NOT address the issue of securing a customer's credit card information. As part of the present invention, a surrogate or proxy card number solution may be integrated with the 3D-Secure system, where the credit card number a customer provides to a Merchant Web Site is not the Customer's actual credit card number or PAN, but rather a proxy number generated by the proxy number server.

In order to combine the proxy number solution with 3D Secure, a proxy card solution comprised of an Surrogate Number (Internet) Server and Surrogate Number (Financial) Server and Surrogate Number (Database) Server may be connected to the computer(s) of an Issuer. The consumer would receive via the Internet or any other communication with the Internet server, a proxy card number. This proxy or surrogate number may be used by the customer as part of a 3D-Secure transaction, and the financial server may translate or map the proxy number back to the customer's actual card number for purposes of authentication and authorization. The Internet server and the Financial Server may either share a database containing records correlating a proxy number with an actual credit card number or PAN, or the Proxy server may, either directly or indirectly, update the Financial server's database.

Figure 8:
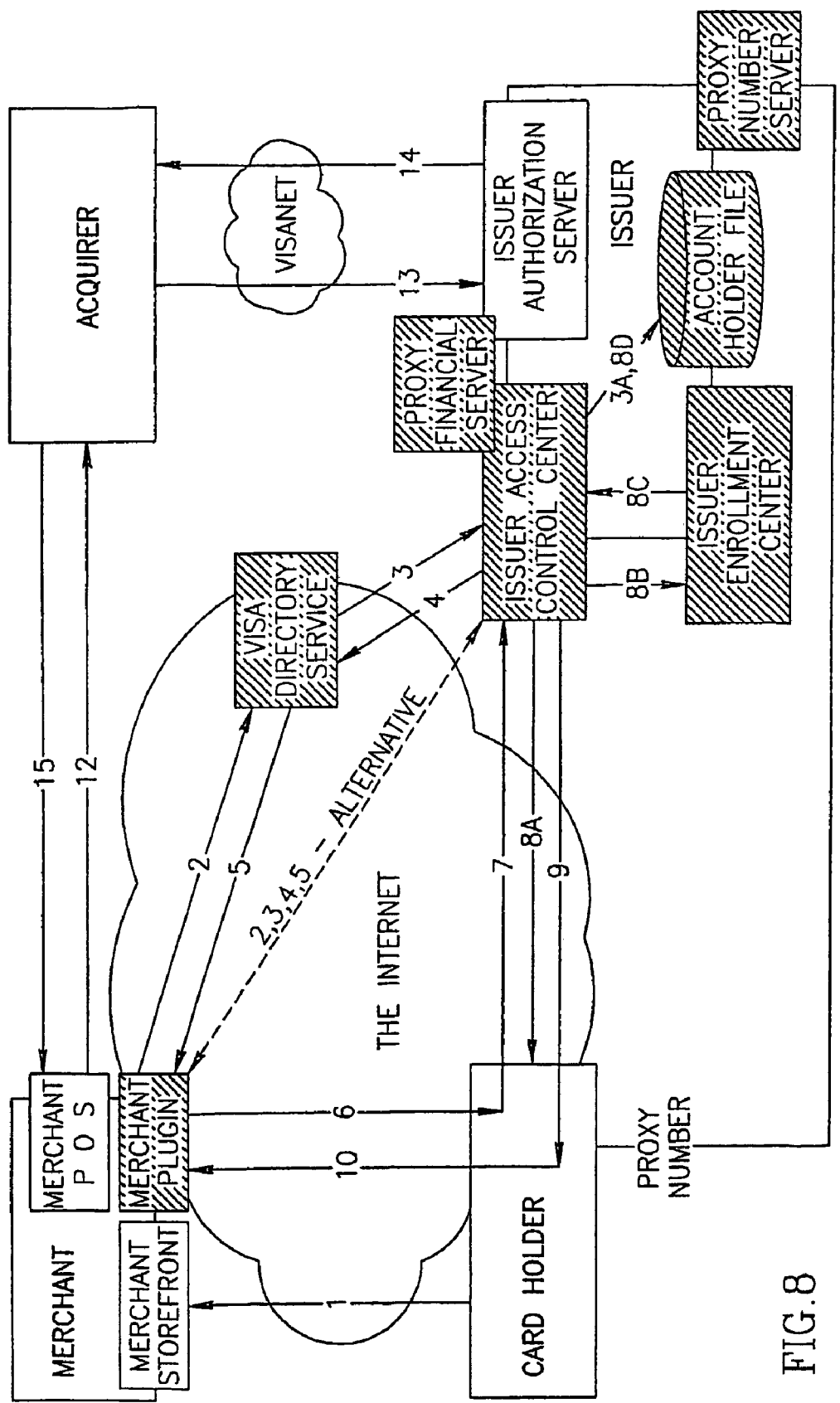
FIG. 8 is a system level diagram depicting the interaction of various 3D Secure components with an integrated surrogate or proxy credit card solution.

Turning now to FIG. 8, there is shown a diagram depicting a 3D-Secure transaction flow similar to what is shown in FIG. 2, but with a Surrogate Number (Internet) Server and a Surrogate Number (Financial) Server added to the Issuer's infrastructure. The steps in FIG. 8 are identical to the steps describer for FIG. 2, except that prior to step 1, sending credit card information to the Merchant Web Site, the Internet Server provides the customer or user with a proxy number. The Surrogate Number Internet Server may handle all the interaction with the customer required to authenticate the customer and to accept the customer's request for a proxy number. The proxy number may be a one-time use number or may be valid for several transactions or for some predefined period or amount. The proxy number may be transmitted to the client through a secure web browser or a secure client application.

After receiving the proxy number, the customer may proceed as he or she would otherwise using a 3D-Secure system. The financial server may act as a translator or mapper, translating the proxy number into the actual account number for the ACS and/or the authorization server.

Purchase-Order Payment Reconciliation e-Procurement platforms have become important in "Business to Business" ("B2B") commerce. Procurement cards ("P-Cards" credit cards used for procurement of supplies for a company, have become widely used. Reconciliation between purchase-orders and charges made to P-Cards is time consuming and costly to organizations.

A Proxy number solution such as the one describer above, may be used to generate specific proxy numbers for each purchase made using a P-Card. When making a purchase, the specific proxy number generated for that purchase may be recorded with the purchase order associated with the purchase. The proxy number may be passed by the merchant to the issuer, and the issuer may provide the P-Card holder with a statement containing details about what amount was charged by the merchant to each proxy number. Each proxy number and its associated charge may then be compared against the purchase order associated to the proxy number in order to determine whether the correct amount was charged to the P-Card for that given purchase order.

Figure 9:
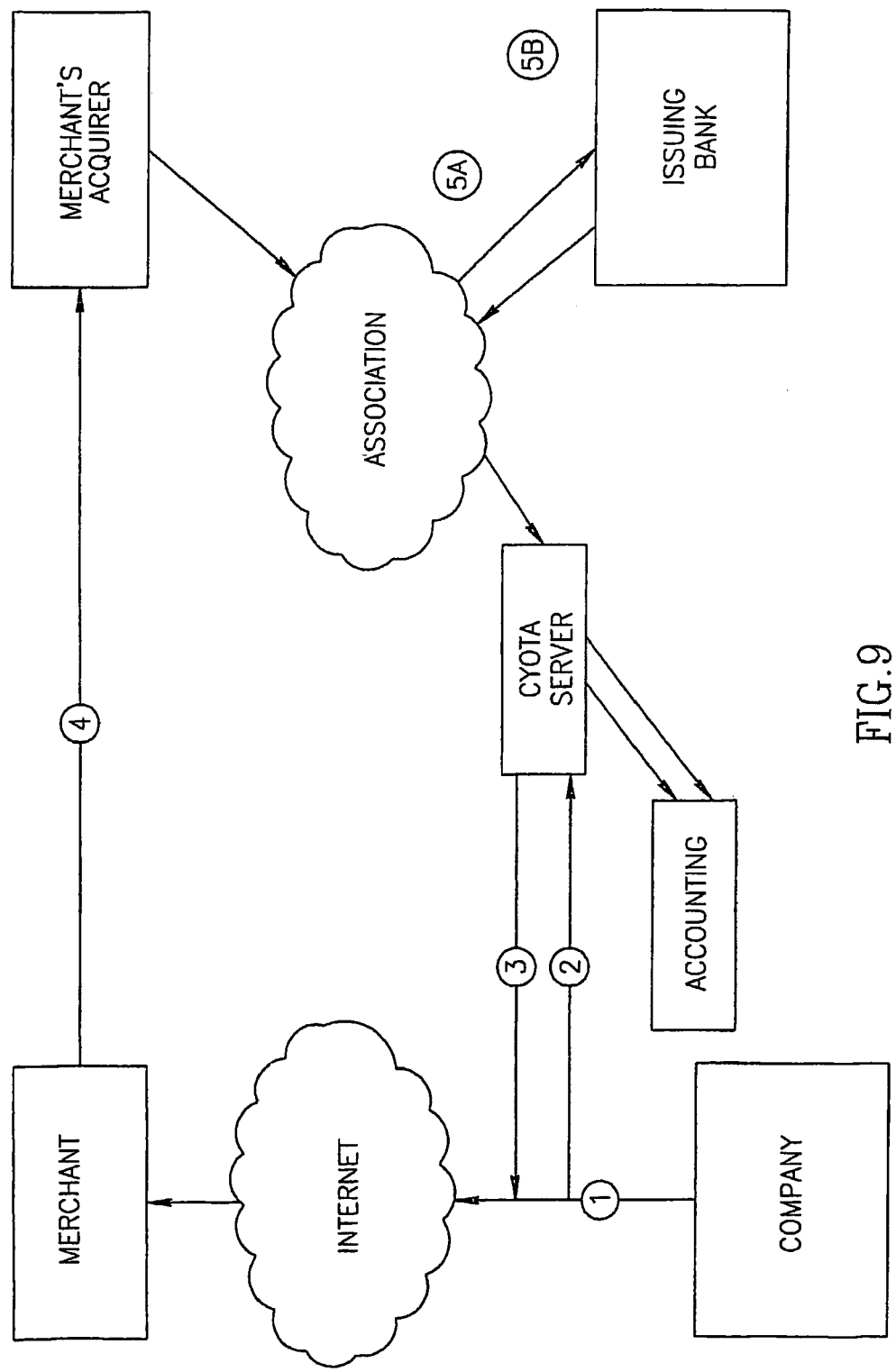
FIG. 9 is a system level diagram depicting transaction flow in a purchase order payment reconciliation system.

Turning now to FIG. 9, there is shown a systems level diagram of a purchase order payment reconciliation system according to the present invention. The diagram depicts an example of a transaction using this system, the step of which are:
1. A company uses e-Procurement Platform to select and order a product.
2. The e-Procurement system requests a Single use number from the Proxy solution. It may also transfer Purchase Order #, Accounting # and pre-defined limitations.
3. Single use number is generated and returned to Company.
4. Regular Authorization follows. Due to Split Stream Integration, Transaction is routed to Proxy solution. Pre-defined limitations may be checked. Number is switched to real account number and routed to Issuer for regular authorization.
5. Settlement Phase.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A method of registering a card holder to a service during an online card transaction, said method comprising:
    after commencement of an online transaction by a card holder, receiving from a merchant web site a query as to whether the card holder is registered with an authentication service provider, wherein being registered with said authentication service provider requires authentication prior to proceeding with the online transaction;
    determining whether the card holder is registered with said authentication service provider; and
    if said card holder is not registered,
        sending a positive response to the merchant web site, thereby indicating that said card holder is registered with said authenticating service provider, and
        commencing registration of said card holder with said authentication service provider.

2. The method according to claim 1, wherein said positive response is sent to the merchant web site regardless of whether the card holder is registered.

3. The method according to claim 2, further comprising sending a failure to authenticate signal to the merchant web site in the event that the cardholder fails to complete a registration form.

4. The method according to claim 1, wherein a registration form is sent to the cardholder in the event the card holder meets predetermined criteria.

5. A system for registering a card holder to a service during an online card transaction, said system comprising a processor to:
    after commencement of an online transaction by a card holder, receive from a merchant web site a query as to whether the card holder is registered with an authentication service provider, wherein being registered with said authentication service provider requires authentication prior to proceeding with the online transaction;
    determine whether the card holder is registered with said authentication service provider; and
    if said card holder is not registered,
        send a positive response to the merchant web site, thereby indicating that said card holder is registered with said authentication service provider, and
        commence registration of said card holder with said authentication service provider.

6. The system according to claim 5, wherein the processor is to send said positive response to the merchant web site regardless of whether the card holder is registered.

7. The system according to claim 6, wherein the processor is to send a registration form directly to the card holder in the event the card holder is not registered and send a failure to authenticate signal to the merchant web site in the event that the cardholder fails to complete the registration form.

8. The system according to claim 5, wherein a registration form is sent to the cardholder in the event the cardholder meets predetermined criteria.

9. The system according to claim 6, wherein the processor is to send a registration form directly to the card holder in the event the card holder is not registered and send a failure to authenticate signal to the merchant web site in the event that the cardholder fails to satisfy predetermined criteria.

10. The method according to claim 2, further comprising sending a registration form directly to the card holder in the event the card holder is not registered.

11. The method according to claim 3, further comprising sending a registration form directly to the card holder in the event the card holder is not registered.

12. The method according to claim 2, further comprising sending a failure to authenticate signal to the merchant web site in the event that the card holder fails to satisfy predetermined criteria.

13. The method according to claim 12, further comprising sending a registration form directly to the card holder in the event the card holder is not registered.

* * * * *